US012399487B2

(12) United States Patent
Kitchen et al.

(10) Patent No.: US 12,399,487 B2
(45) Date of Patent: Aug. 26, 2025

(54) IN-SITU INSPECTION METHOD BASED ON DIGITAL DATA MODEL OF WELD

(71) Applicant: BWXT Advanced Technologies LLC, Lynchburg, VA (US)

(72) Inventors: Ryan Scott Kitchen, Knoxville, TN (US); Matthew Paul Levasseur, Lynchburg, VA (US); Ryan Steven Wackerly, Barberton, OH (US); Ross Pivovar, Lynchburg, VA (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 592 days.

(21) Appl. No.: 17/221,885

(22) Filed: Apr. 5, 2021

(65) Prior Publication Data

US 2021/0318673 A1 Oct. 14, 2021

Related U.S. Application Data

(60) Provisional application No. 63/052,182, filed on Jul. 15, 2020, provisional application No. 63/007,320, filed on Apr. 8, 2020.

(51) Int. Cl.
*G05B 19/418* (2006.01)
*G05B 13/02* (2006.01)
(Continued)

(52) U.S. Cl.
CPC ..... *G05B 19/41875* (2013.01); *G05B 13/027* (2013.01); *G05B 13/042* (2013.01);
(Continued)

(58) Field of Classification Search
CPC ............ G05B 19/41875; G05B 13/027; G05B 13/042; G05B 13/048; G05B 2219/32193;
(Continued)

(56) References Cited

U.S. PATENT DOCUMENTS

2005/0169346 A1* 8/2005 Murray ............... B29C 66/8748
374/121
2014/0042136 A1* 2/2014 Daniel ............... G05B 19/4183
219/130.5
(Continued)

FOREIGN PATENT DOCUMENTS

CN 112365501 B * 5/2021 ........... G06N 3/0454
JP 2007-330987 A 12/2007
(Continued)

OTHER PUBLICATIONS

Feng, Weldment contour detection algorithm based on convolutional neural network, 2021, google patents, note that this is a machine translation of CN112365501 (Year: 2021).*
(Continued)

*Primary Examiner* — Robert E Fennema
*Assistant Examiner* — Yvonne Trang Follansbee
(74) *Attorney, Agent, or Firm* — Morgan, Lewis & Bockius LLP

(57) ABSTRACT

A method inspects weld quality in-situ. The method obtains a plurality of sequenced images of an in-progress welding process and generates a multi-dimensional data input based on the plurality of sequenced images and/or one or more weld process control parameters. The parameters may include: (i) shield gas flow rate, temperature, and pressure; (ii) voltage, amperage, wire feed rate and temperature (if applicable); (iii) part preheat/inter-pass temperature; and (iv) part and weld torch relative velocity). The method generates defect probability and analytics information by applying one or more computer vision techniques on the multi-dimensional data input. The analytics information includes predictive insights on quality features of the in-progress welding process. The method then generates a 3-D visualization of one or more as-welded regions, based on the analytics information, and the plurality of sequenced images. The 3-D
(Continued)

visualization displays the quality features for virtual inspection and/or for determining weld quality.

20 Claims, 25 Drawing Sheets

(51) Int. Cl.
G05B 13/04 (2006.01)
G06T 7/00 (2017.01)
G06T 7/13 (2017.01)
G06T 7/136 (2017.01)
G06T 17/00 (2006.01)

(52) U.S. Cl.
CPC .......... *G05B 13/048* (2013.01); *G06T 7/0004* (2013.01); *G06T 7/13* (2017.01); *G06T 7/136* (2017.01); *G06T 17/00* (2013.01); G05B 2219/32193 (2013.01); G05B 2219/32368 (2013.01); G05B 2219/45135 (2013.01); G06T 2207/10016 (2013.01); G06T 2207/20081 (2013.01); G06T 2207/20084 (2013.01)

(58) Field of Classification Search
CPC ........... G05B 2219/32368; G05B 2219/45135; G06T 7/136; G06T 7/13; G06T 7/0004; G06T 17/00; G06T 2207/10016; G06T 2207/20081; G06T 2207/20084
See application file for complete search history.

(56) References Cited

U.S. PATENT DOCUMENTS

| 2015/0276158 | A1* | 10/2015 | Boero | ............... | F21V 9/08 156/272.8 |
| 2017/0032281 | A1* | 2/2017 | Hsu | .................. | G05B 23/0229 |
| 2017/0151634 | A1 | 6/2017 | Witney | | |
| 2018/0322383 | A1* | 11/2018 | Feng | .................. | G06N 3/04 |
| 2019/0163172 | A1 | 5/2019 | Daniel et al. | | |
| 2020/0055148 | A1 | 2/2020 | Hsu | | |
| 2020/0097826 | A1* | 3/2020 | Du | .................. | G06F 13/16 |
| 2021/0339343 | A1* | 11/2021 | Lodewijk Kees | ... | B23K 9/0956 |

FOREIGN PATENT DOCUMENTS

| JP | 2012-002605 A | 1/2012 |
| JP | 2017-106908 A | 6/2017 |
| JP | 2018-192524 A | 12/2018 |

OTHER PUBLICATIONS

International Search Report and Written Opinion issued on Jul. 15, 2021 in International Application No. PCT/US21/26120.

Huang et al., "A Laser-Based Vision System for Weld Quality Inspection", Sensors, 2011, 11(1), 506-521; doi: 10.3390/s110100506.

Kovacevic et al., "Monitoring of WeldJoint Penetration Based on Weld Pool Geometrical Appearance", Welding Research Supplement, (Oct. 1996), pp. 317-s to 329-s.

Bacioiu et al., "Automated defect classification of Aluminium 5083 TIG welding using HDR camera and neural networks," Journal of Manufacturing Processes, vol. 45, pp. 603-613; Sep. 1, 2019. https://doi.org/10.1016/j.jmapro.2019.07.020.

Office Action issued Jan. 30, 2024 in related Canadian application CA 3,173,497.

Extended European Search Report dated Jun. 24, 2024 issued in corresponding European Application 21784492.7.

Office Action dated Nov. 12, 2024, issued in corresponding Canadian Patent Application No. 3,173,497.

Office Action dated Dec. 17, 2024, issued in corresponding Japanese Patent Application No. 2022-561522.

* cited by examiner

730

Left: CT scan to verify data model
Right: DE pore interrogated via microscopy, validating data model predictions

IN-SITU INSPECTION METHOD BASED ON DIGITAL DATA MODEL OF WELD

RELATED APPLICATION DATA

This application is based on and claims priority under 35 U.S.C. § 119 to U.S. Provisional Application No. 63/052,182, filed Jul. 15, 2020, and to U.S. Provisional Application No. 63/007,320, filed Apr. 8, 2020, the entire contents of both applications are incorporated herein by reference.

TECHNICAL FIELD

The disclosed implementations relate generally to welding and more specifically to systems, methods, and user interfaces for inspection of weld based on in-situ sensor capture and digital machine/deep learning models.

BACKGROUND

Welding has a significant impact on manufacturing companies and the economy as a whole. Advances in welding technology (e.g., robotic welding) provide cost efficiency and consistency. Quality of welding is consequential to safety and integrity of systems. Manufacturing of components for safety critical systems, such as nuclear pressure vessels, is typically guided by strict requirements and design codes. Traditionally, such requirements are verified through costly non-destructive examination (NDE) after weld operations are complete, or through prequalification of weld process (to predict weld quality). After welding process is complete, routine repairs are performed to ensure quality (e.g., replacing or welding defective parts), sometimes without the knowledge of what caused the defects. Conventional techniques for welding quality control are error-prone, and cost-intensive.

SUMMARY

In addition to the problems set forth in the background section, there are other reasons where an improved system and method of inspecting welding quality are needed. For example, because existing techniques rely on postmortem analysis of welding failures, context information is absent for proper root-cause analysis. Some techniques only apply to a limited range of weld processes. Conventional systems for weld inspection rely on process method qualification, NDE post-weld inspection, or regressive techniques using weld process parameters, such as voltage, torch speed, amps, gas flow, but such conventional methods do not regress well to the desired quality features. The present disclosure describes a system and method that addresses at least some of the shortcomings of conventional methods and systems.

The current disclosure uses computer vision, machine learning, and/or statistical modeling, and builds digital models for in-situ inspection of welding quality (i.e., for inspection of weld quality while the welding is in progress), in accordance with some implementations.

The visualizations are generally from in-situ imagery or other processed signals, usually as a result of computer vision with predictive insights from machine/deep learning algorithms According to some implementations, the invention uses one or more cameras as sensors to capture sequenced imagery (e.g., still images or video) during welding of weld events (e.g., base metal and filler melt, cooling, and seam formation events). The sequenced images are processed as a multi-dimensional data array with computer vision and machine/deep learning techniques to produce pertinent analytics, a 3-dimensional visual display of the as-welded region to reveal quality features for virtual inspection, and/or predictive insights to location and extent of quality features, for determining weld quality. In some implementations, images of a welding process in progress are processed using a trained computer vision and machine/deep learning algorithms, to produce dimensionally-accurate visualization and defect characterization. In some implementations, the computer vision and machine/deep learning algorithms are trained to determine weld quality based on images of well pool shapes.

In accordance with some implementations, a method executes at a computing system. Typically, the computing system includes a single computer or workstation, or plurality of computers, each having one or more CPU and/or GPU processors and memory. The method of machine learning modeling implemented does not generally require a computing cluster or supercomputer.

In some implementations, a computing system includes one or more computers. Each of the computers includes one or more processors and memory. The memory stores one or more programs that are configured for execution by the one or more processors. The one or more programs include instructions for performing any of the methods described herein.

In some implementations, a non-transitory computer readable storage medium stores one or more programs configured for execution by a computing system having one or more computers, each computer having one or more processors and memory. The one or more programs include instructions for performing any of the methods described herein.

Thus methods and systems are disclosed that facilitate in-situ inspection of weld processes. The discussion, examples, principles, compositions, structures, features, arrangements, and processes described herein can apply to, be adapted for, and be embodied in welding processes.

BRIEF DESCRIPTION OF THE DRAWINGS

For a better understanding of the disclosed systems and methods, as well as additional systems and methods, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
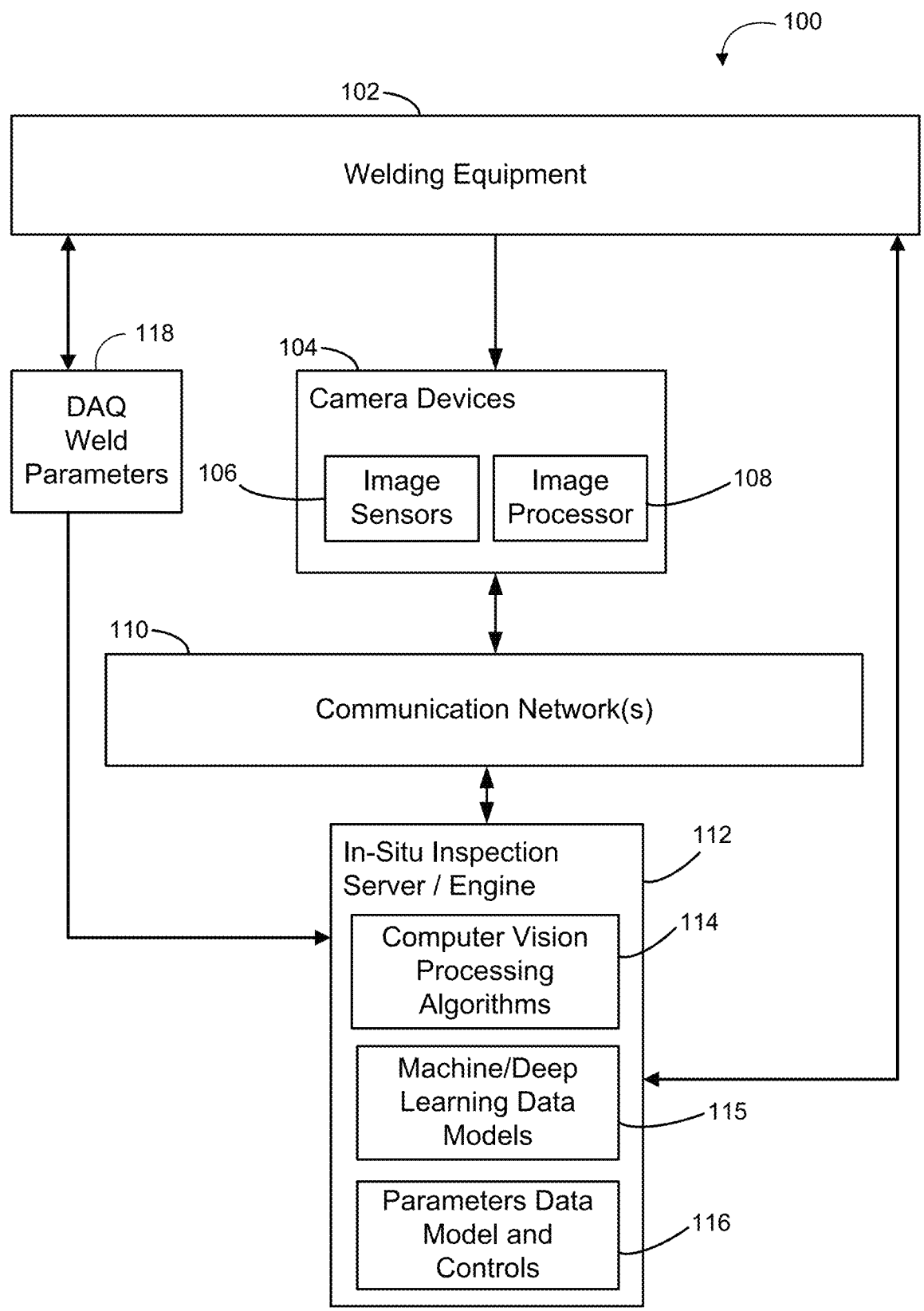
FIG. 1 is a block diagram of a system for in-situ inspection of welding processes using digital models, in accordance with some implementations.

FIG. 1 is a block diagram of a system 100 for in-situ inspection of welding processes using digital data models, in accordance with some implementations. Welding equipment 102 is monitored by one or more camera devices 104, each device 104 including one or more image sensors 106 and one or more image processors 108. Data collected by the camera devices is communicated to an in-situ inspection server 112 using a communication network 110. The welding equipment 102 uses a set of weld parameters 118, which can be updated dynamically by the in-situ inspection server 112.

The in-situ inspection server 112 uses some standard computer vision processing algorithms 114, as well as some machine/deep learning data models 115.

The process captures imagery in-situ, during the weld operation and applies standard image processing techniques to accentuate features (e.g., Gaussian blur, edge detection of electrode and weld pool, signal to noise filtering, and angle correction). The process uses temporal cross-correlations to align image stack or video frames to geometry. In some implementations, this information is fed to one or more mounted robotic cameras for accurate image capture. The system converts temporal image trends to stationary signals by taking the temporal derivative of the images. The system trains a convolutional neural network on sequential, lagged image batches with 3D convolutions (e.g., pixel position, intensity, and color/spectral band). Based on this, the machine/deep learning data models 115 output the probability of an event (either yes/no or type of defect).

The Parameter Data Model 116 identifies anomalous portions of the signal. Traditional signal noise processing of monitored weld parameters (such as voltage along a timeline) conventionally fails to indicate a weld quality defect. This process works using a sequence of steps: (i) convert the analog signal to digital; (ii) train a temporal convolutional neural network, with sliding window and gated activation functions, to learn typical signal patterns across many (e.g., millions) of time series data points; (iii) minimize a cross-entropy loss function; (iv) take the difference of the parameter data stream and the learned data stream; and (v) use kernel density estimation to find anomalous portions of the signal.

Parameter Data Model Controls 116 provide feedback to an operator and/or control of weld parameter to maintain quality. The convolutional network weights parameters to minimize the loss function. These weights contain information from the images on key characteristics indicating a defect. The operation proceeds by providing a visualization of normalized gradient of weights to indicate key defect characteristics. These weights are indicated in time along the temporal image batch, to locate the defect in time. These weights indicate the part of the image that is different, to include its intensity, shape, or spectral hue. The Parameter Data Model Controls 116 collect a data set of all defect indications. This is fed into a statistical model (e.g., Poisson regression) to map out valid and invalid weld parameter space.

In some implementations, the Parameter Data Model Controls 116 use topology to warn of impending defects. A high fidelity topology can feed to an automatic weld to avoid defects.

Figure 2:
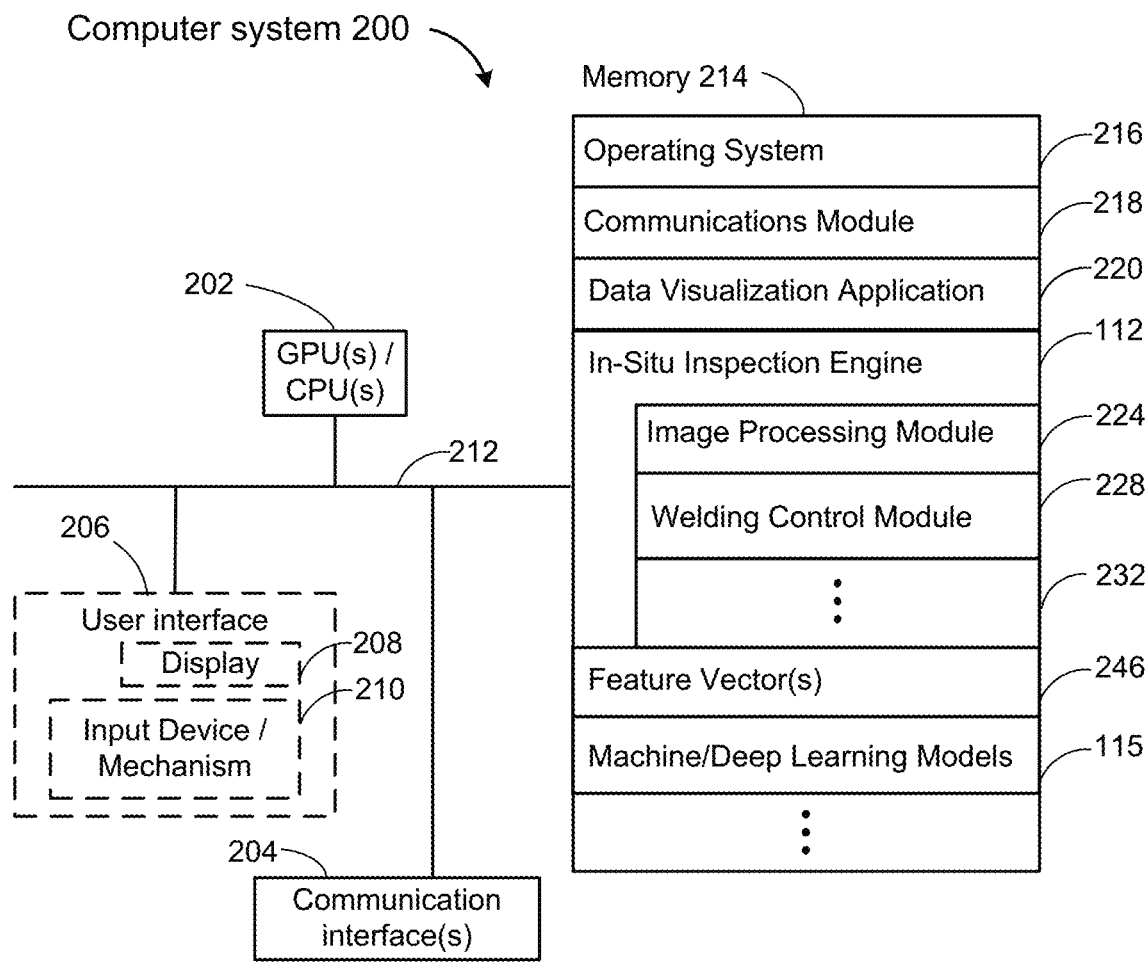
FIG. 2 is a block diagram of a computing device according to some implementations.

FIG. 2 is a block diagram illustrating a computing device 200 in accordance with some implementations. Various examples of the computing device 200 include high-performance clusters (HPC) of servers, supercomputers, desktop computers, cloud servers, and other computing devices. The computing device 200 typically includes one or more processing units/cores (CPUs and/or GPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components.

The computing device 200 may include a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the GPU(s)/CPU(s) 202. The memory 214, or alternatively the non-volatile memory device(s) within the memory 214, comprises a non-transitory computer readable storage medium. In some implementations, the memory 214, or the computer-readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a data visualization application or module 220 for displaying visualizations of weld defects for in-situ inspection;
- an input/output user interface processing module (not shown), which allows a user to specify parameters or control variables;
- an in-situ inspection engine 112, and described above in FIG. 1;
- feature vectors 246, as used by the machine/deep learning models 115; and
- machine/deep learning/regression models 115.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

In some implementations, although not shown, the memory 214 also includes modules to train and execute models described above in reference to FIG. 1. Specifically, in some implementations, the memory 214 also includes a stochastic sampling module, machine learning models 115, a coding framework, one or more convolutional neural networks, a statistical support package, as well as other imagery, signals, or associated data.

Example Weld Processes and Weld Quality Assessment

According to some implementations, techniques disclosed herein apply to a wide range of weld processes. For example, the techniques can be used to inspect weld quality for gas tungsten arc welding or GTAW (sometimes called Tungsten-electrode inert gas welding or TIG), plasma arc welding, laser welding, electron beam welding, shielded metal, and gas metal welding, automated and/or manual welding, pulsed welds, and submerged welds. In some implementations, the techniques are applied during operations at multiple facilities, and/or on two or more types of welds (e.g., GTAW, where a weld torch moves across a fixed part, as is the case with most cladding, and some linear welds, and GTAW, where a weld torch is fixed and the part rotates, as is the case with circle seam welds, and some cladding). In some implementations, the techniques are used to simultaneously inspect weld quality for a large number of welds (e.g., a particular steam generator has 257 thick welds, with strict inspection criteria and a high reject rate).

Figure 3A:
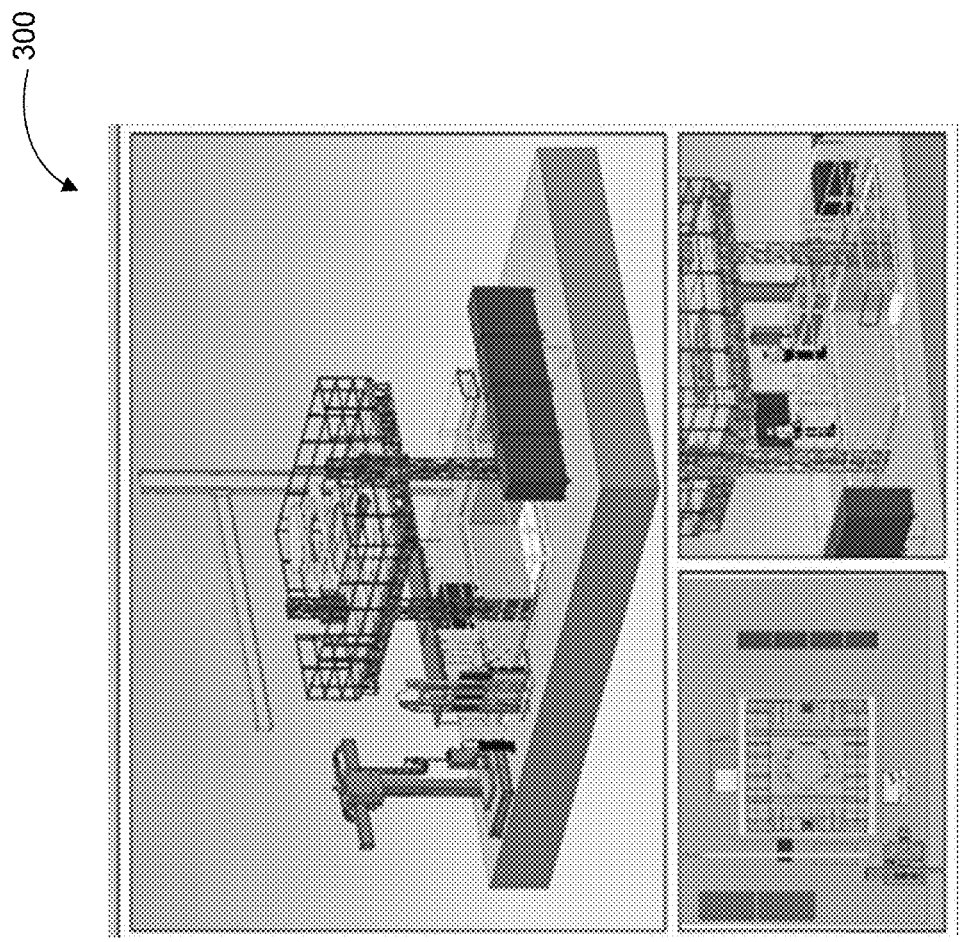
FIG. 3A is an illustration of an example platform and crane apparatus for welding large structures, according to some implementations.

FIG. 3A is an illustration of an example platform and crane apparatus 300 for welding large structures, according to some implementations.

Figure 3B:
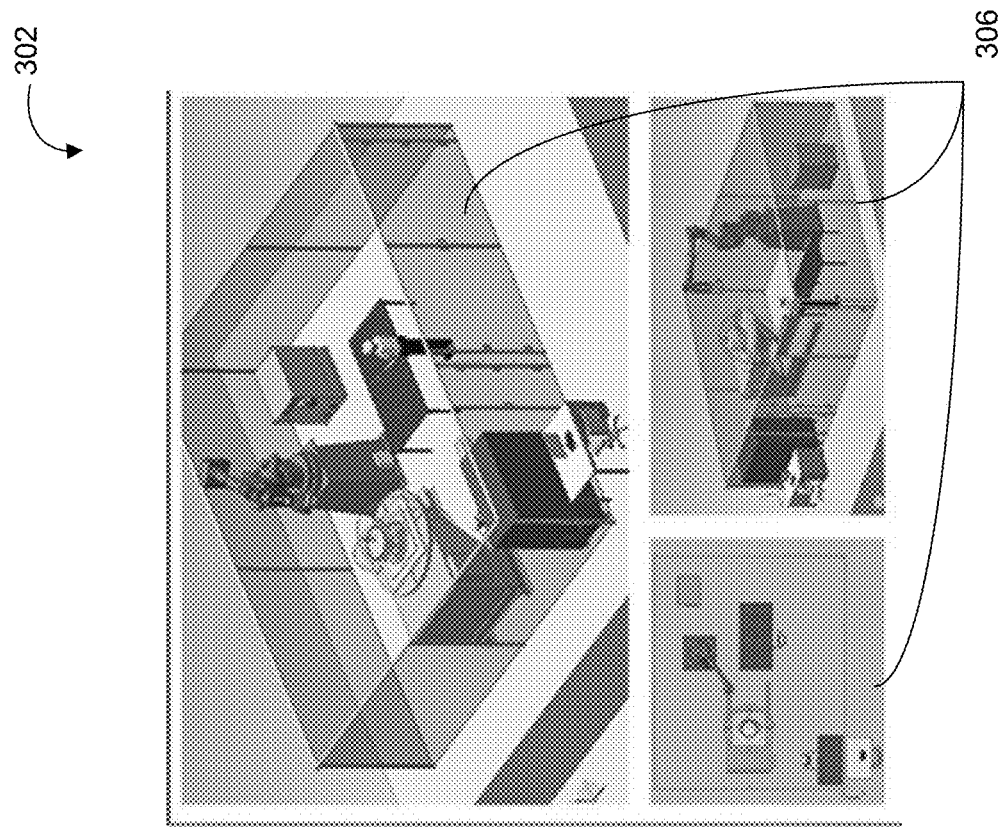
FIGS. 3B and 3C are example weld processes, according to some implementations.
Figure 3B:
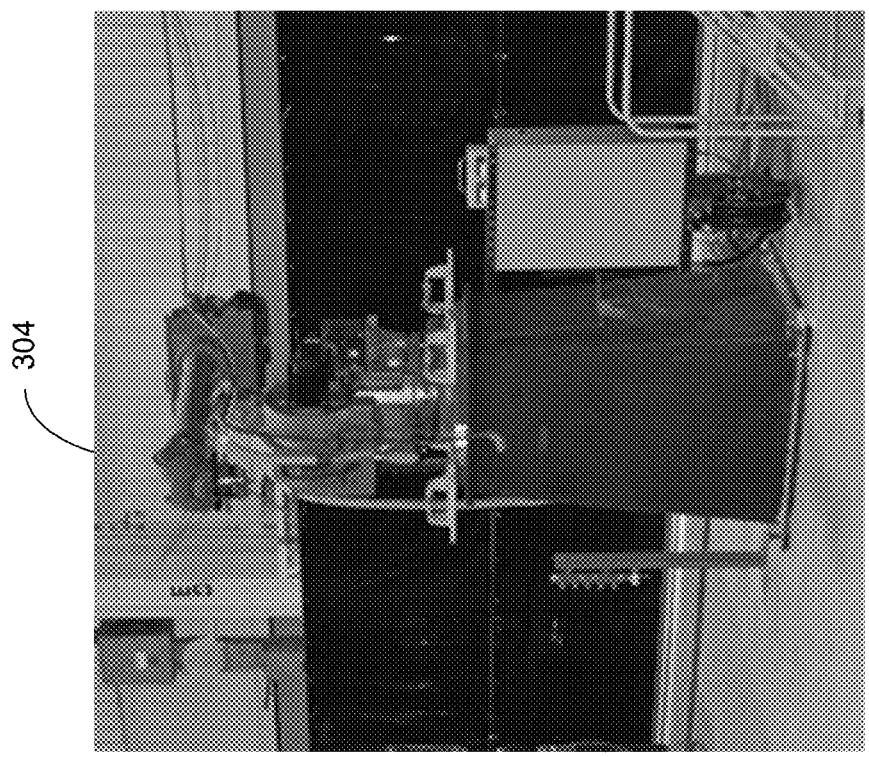
Figure 3C:
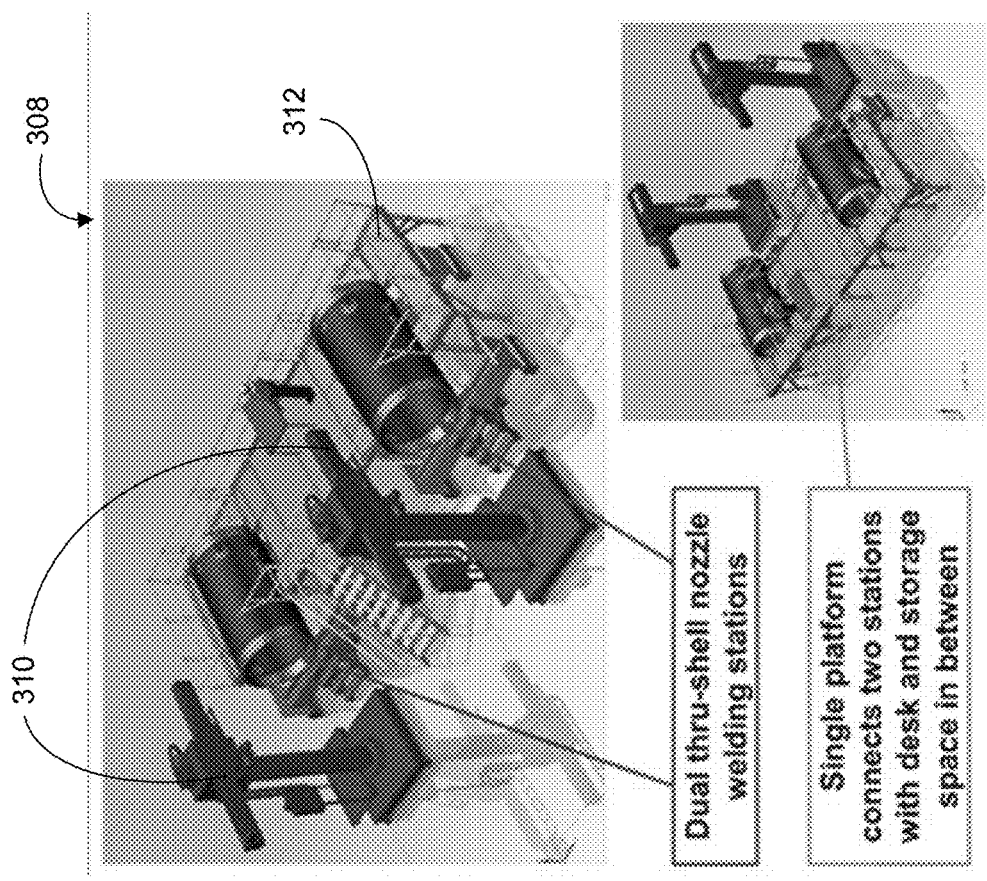
Figure 3C:
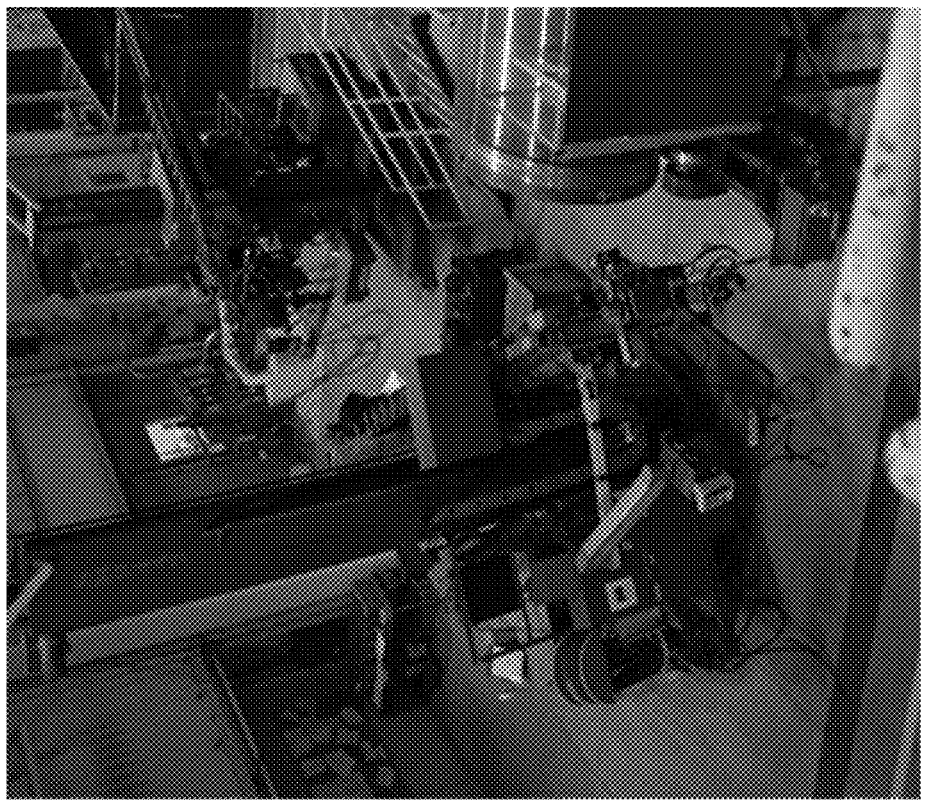

FIG. 3B is an example weld process 302, according to some implementations. The example shows a robotic arm welder 304, and views 306 of the welding process. Traditionally, robotic welding is monitored by a weld technician who observes weld melt and filler deposition (e.g., via a video monitor). The technician identifies abnormalities, and uses experience and observation to determine weld quality. Conventional systems do not capture weld process data, or do not use captured data to inspect quality. In some situation, pre-inspection quality control is performed using a qualified process based on pre-production mock-up where process parameters are determined. Most conventional systems require manual supervision, produce highly subjective and variable results, and/or detect only a small percentage of defects. FIG. 3C is another example weld process 308, according to some implementations. The example shows dual thru-shell nozzle welding stations 310, and a single platform 312 connecting two stations with desk and storage space in between.

Conventional systems use mockups for establishing process control parameters that are based on trial and error. A weld data sheet specifies an initial set of parameters to try. The parameters are iteratively refined based on results of experiments. Some implementations use welding inspection technologies, such as Radiographic Testing (which is sensitive to corrosion, changes in thickness, voids, cracks, and material density changes), Ultrasonic Testing (a method of detecting defects on or below the surface of materials, and measuring the wall thickness of tubing, pipe, and other round stock), Magnetic Particle Testing (used for finding surface/near surface defects in ferromagnetic material), visual inspection (visual check for completeness, cracks, uniformity). In some instances, a dye penetrant test (PT) might be performed to test for surface flaws on-the-fly. A PT might be performed after the completion of a few layers, and then welding is continued.

Some implementations use machine vision for inspecting weld quality of an in-progress welding process. Some implementations use deep learning techniques where input parameters need not be explicitly defined, and the algorithm automatically derives the parameters. Some implementations use machine vision, and/or image processing techniques to develop non-linear weld quality correlations (e.g., as applied to a physically linear weld path). Some implementations use the techniques described herein for additive manufacturing where imagery is captured (e.g., layer by layer) using built-in sensors. Some implementations perform real-time monitoring, identifying defects as they occur or soon after the defects occur. Some implementations use limited image parameters (e.g., shape of weld pool and/or a box-boundary around the shape). Some implementations process images based on a trained computer vision and machine/deep learning algorithm, produce intelligent image reconstruction and quality prediction, and/or produce dimensionally-accurate visual and quantitative weld defect characterization(s), during a welding process (or as the welding completes).

Example Shape Analysis, Laser Scanning, Neural Networks

Figure 4B:
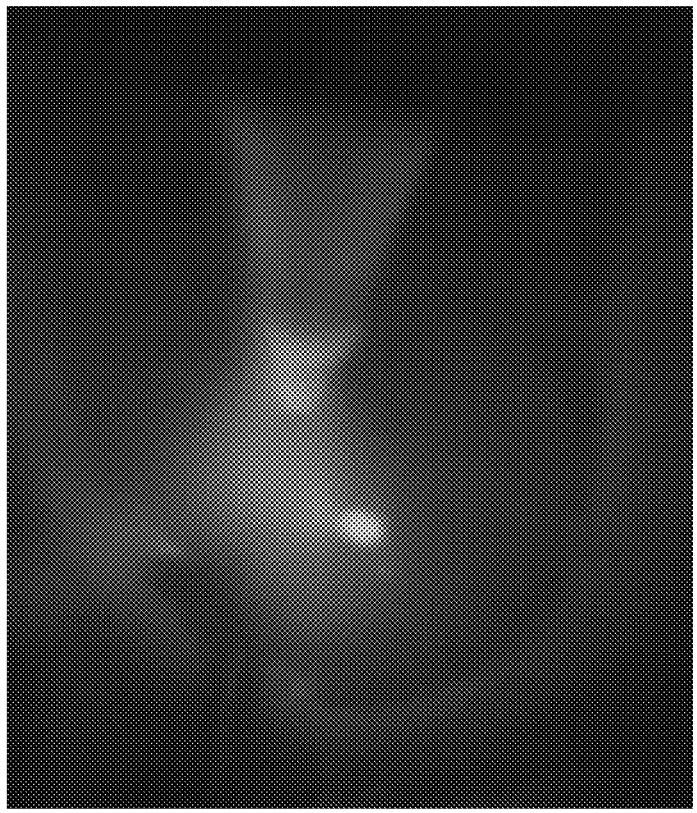
FIGS. 4A-4C provide examples of a weld pool shape, according to some implementations.
Figure 4A:
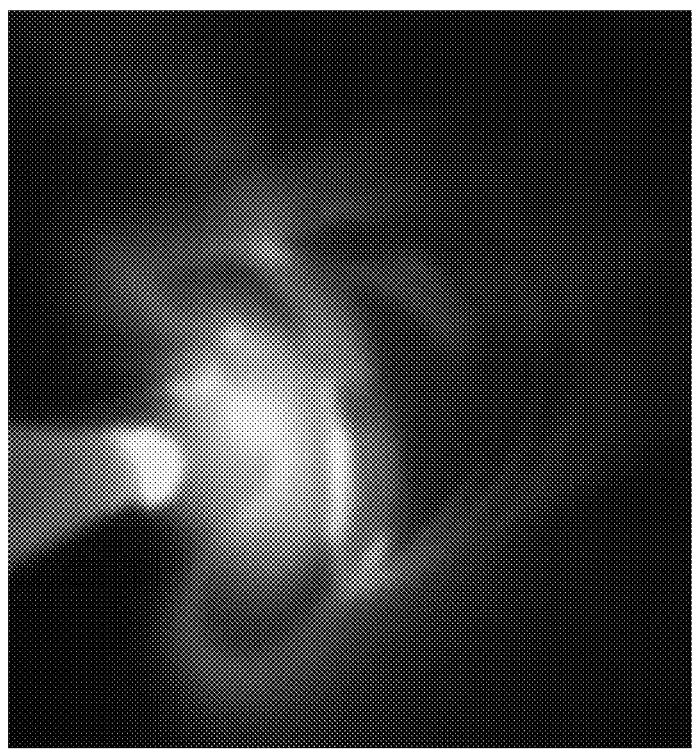
Figure 4C:
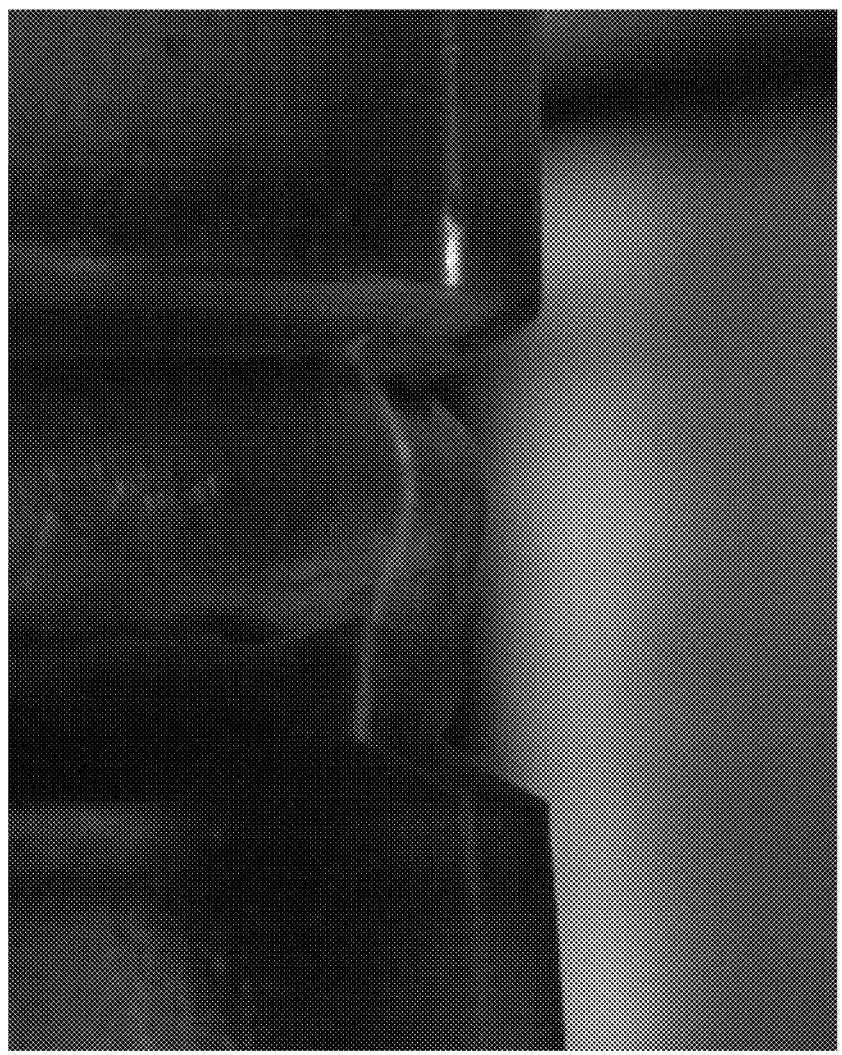

Some implementations use one or more optical cameras with a mechanical shutter and a laser to capture images of surface of a weld pool. Some implementations apply image processing and machine learning algorithms on fully defined shapes of weld pools, and/or images, rather than approximating size of welding pool. For example, some conventional systems approximate weld pool size as dimensions of a 2-D bounding box (width, height), and/or define weld pool shapes by angles contained in the tail. In some conventional systems, machine learning algorithm is trained using limited scalar attributes extracted from images. FIG. 4A-4C provide examples of weld pool shapes processed or analyzed using the techniques described herein, according to some implementations.

Some implementations use laser scanning. A point laser points laser beams at a welding surface, and an image sensor captures images of the surface by capturing light through one or more lens filters. The images are post-processed to model the surface. Some implementations model the welding surface using a 2-D cross sectional laser scan. Some implementations identify variations in surface shape, using laser scanning, and detect or infer defects below the surface. Some implementations utilize deviations in measured weld deposition volume to identify subsurface voids and other defects. Some implementations use one or more laser profiles to enhance or determine profile of surface shape. Some implementations use laser scanning in addition to or to augment other techniques described herein.

Some implementations use neural networks for processing images of an in-progress welding to determine weld defects. Some implementations apply, modify, and/or discover (or search for) appropriate machine learning, and deep learning for the purpose of in-situ weld inspection. Some implementations also tune or adjust hyper-parameters to fit with weld types, setups, and sensor configurations.

Some implementations use convolutional neural network (CNN) filters to recognize geometric features of welds and trained patterns of interest. Some implementations train a CNN to recognize weld quality features of interest. Some implementations use image processing, CNN construction, hyper-parameters, as related to voids, misalignments, undercuts, porosity, weld pass variation, and/or crack formation.

Some implementations use appropriate cameras, based on wavelength of imagery, acoustic devices, near-infrared cameras, optical cameras, plus laser lighting techniques to produce shadow effects.

Some implementations provide similar advantages as techniques used in additive manufacturing (where the layer-by-layer manufacturing method is conducive to imaging an as-built in slices). Some implementations use a high-definition infrared (HSIR) camera to provide similar inspection and predictive effects as additive manufacturing, for conventional weld processes, using a high frame rate capture of an in-progress weld process.

Some implementations use one or more cameras, as sensors, to extract sequenced imagery (still or video) during welding (e.g., images of base metal and filler melt, cooling, and seam formation events). In some implementations, the images are processed as a multi-dimensional data array with computer vision and machine/deep learning techniques to produce pertinent analytics, a 3-dimensional visual display of the as-welded region, to show quality features for virtual inspection o provide predictive insights as to location and extent of quality features, for determining weld quality.

Example Defects

Figure 5A:
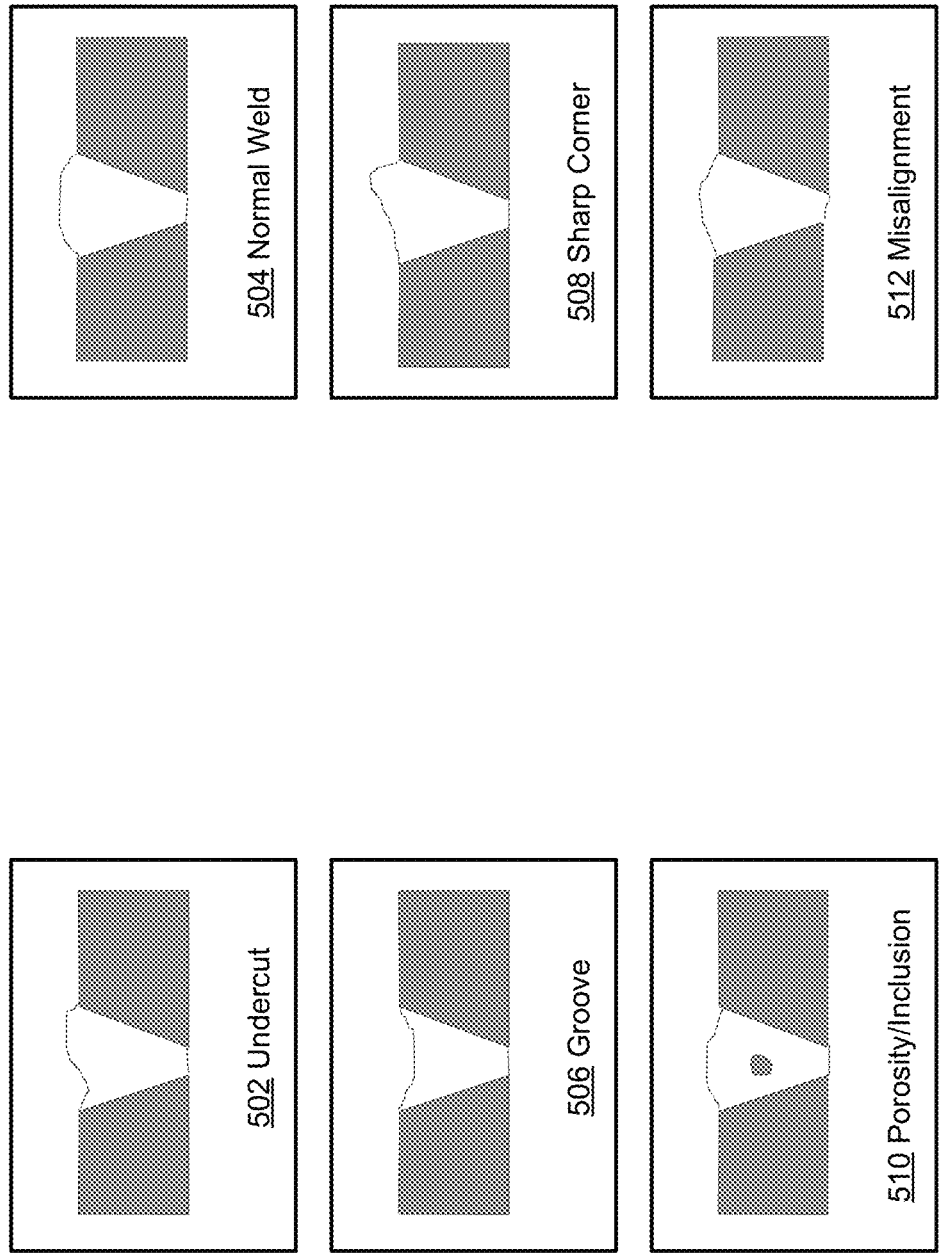
FIGS. 5A and 5B are illustrations of example weld defects, according to some implementations.
Figure 5B:
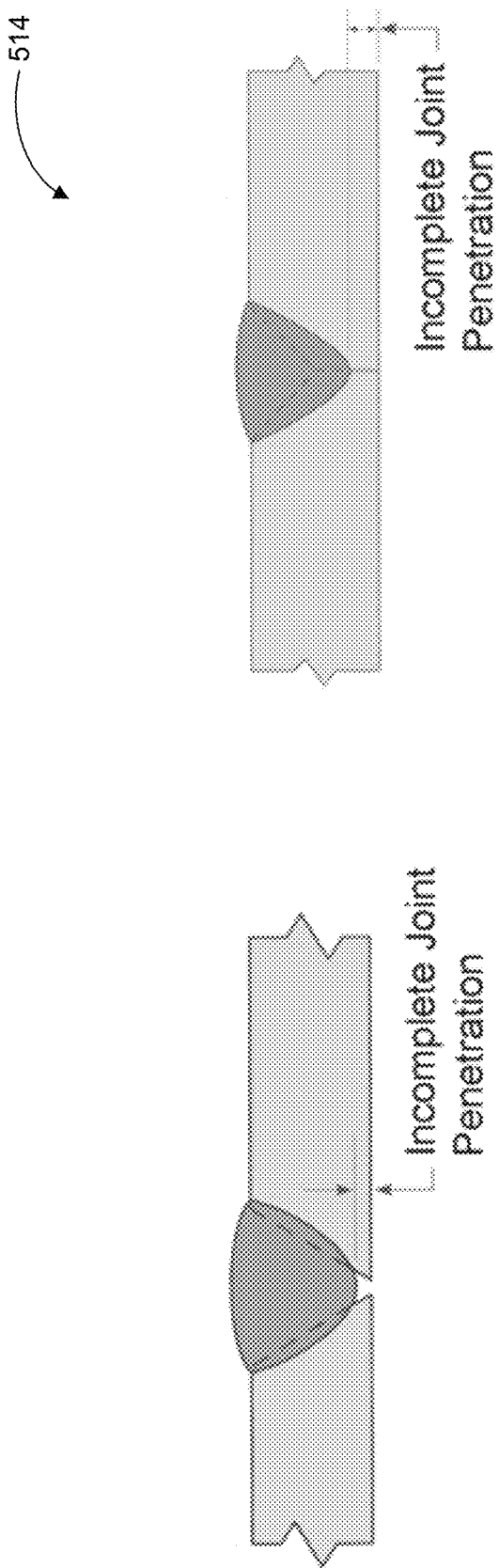

FIGS. 5A and 5B are illustrations of example weld defects, according to some implementations. FIG. 5A illustrates different types of weld defects 500 including undercut 502, normal weld 504, groove 506, sharp corner 508, porosity or inclusion 510 and misalignment 512, according to some implementations. FIG. 5B illustrates incomplete joint penetration, or partial joint penetration weld 514, according to some implementations. Typically, such defects require rework or scrap, and include defects due to lack of fusion, lack of penetration, porosity, cracking, undercutting, and cause delays in manufacturing, due to need for replacement parts or inspection times.

Example Methods for In-Situ Inspection of Welding Quality

Some implementations use one or more cameras to collect infrared, near-infrared, and/or optical imagery (e.g., discrete images and/or video) of a weld-event arc, electrode, and/or weld pool to detect, infer, predict and/or visualize weld quality feature of interest.

Some implementations use computer vision (e.g., Python OpenCV code) along with multiple sensor images and/or laser line profiling, to detect quality defects in welding. Some implementations clean, align, register imagery data, enhance, statistically filter noise and thresholds for objects to reveal and locate patterns and features useful for quality determination. Some implementations visualize observed defects using 2-D or 3-D models of a welded seam or product. Some implementations visualize weld pool shape and vibration changes in 3 dimensions, and/or display locations or representations of weld pool contaminants. Some implementations visualize (or display) just-welded and cooling weld region, shape, texture, size, alignment and contaminants. Some implementations detect and/or display arc changes in shape and intensity. Some implementations detect and/or display electrode spatter and/or degradation, 3-D profile information and pattern formed for fill welds, and/or completeness, voids, separated regions for seam welds.

Examples of Machine Learning and Statistical Modeling Techniques

Some implementations use machine learning or deep learning (e.g., Tensorflow/Keras) to learn and interpret weld imagery data capture. In some implementations, algorithm converts weld sequence images to data arrays. Some implementations integrate weld parameter data. Some implementations use convolutional neural network algorithm (e.g., Tensorflow, Keras, or similar open source machine learning platform) to processes weld imagery data. Some implementations use unsupervised anomaly detection, where models are trained on good welds. Some implementations flag, as anomalies of interest, weld signals that exceed an error threshold. For example, a machine learning algorithm predicts welding error to exceed a threshold probability of error (e.g., 10%), and corresponding weld signals are flagged as anomalies. Some implementations use supervised defect detection, where models are trained on imagery in a data base of known defects (e.g., images of induced defects of different types generated for training and/or testing models).

Figure 6A:
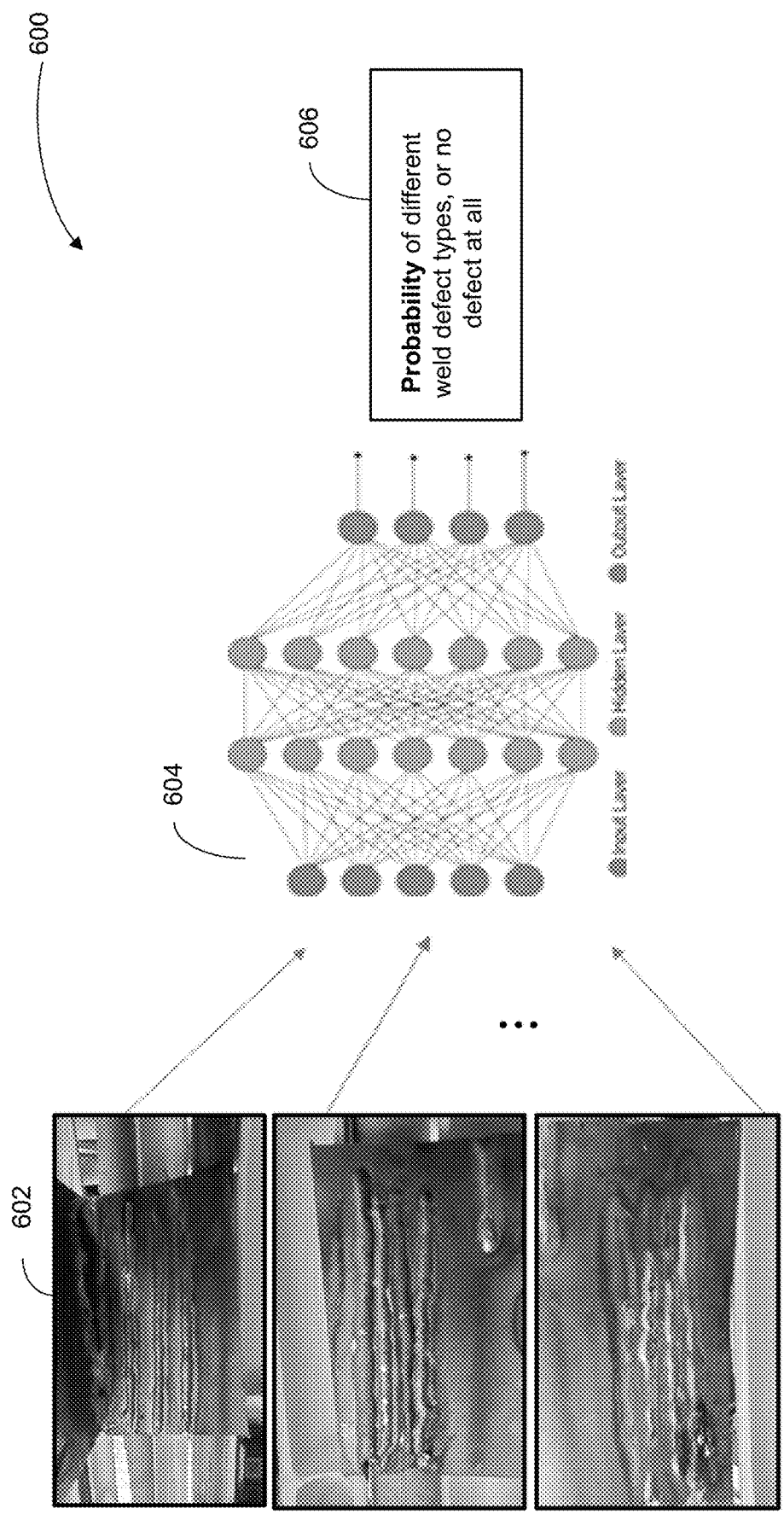
FIG. 6A illustrates an example process for predicting weld quality using a neural network, according to some implementations.

Some implementations use actual imagery of features of interest to capture the actual boundaries of a weld pool shape, speed, spatter, rate of change and other parameters, to train machine learning algorithms to predict weld qualities, defects, and/or to provide characterizations of weld quality. FIG. 6A illustrates an example process 600 for predicting weld quality using a neural network, according to some implementations. Some implementations input weld images 602 to a trained neural network 604 (trained to determine weld quality using images of welds, such as TIG list from NOG-B) to generate probability estimates 606 of different weld defect types (or no defects).

In some implementations, a 2-D or a 3-D digital data model of a weld digital twin is annotated for quality examination, in advance of ex-situ visual or instrument inspection of the weld. Some implementations facilitate inspection by flagging regions of interest. Some implementations facilitate inspector interpretation of anomalies or indications. Some implementations include a system to warn operator of predicted or occurring events, during the weld, so defects can be corrected on-the-fly (or immediately following a defect manifestation), thereby reducing the overall amount of repairs. Some implementations provide statistical summaries and analytics, quantify observed features, and/or predict properties of quality features that manifest themselves over time and features that are not directly observed by sensors, without reliance on post-weld inspection technologies. In some implementations, the final weld digital twin is annotated with quality assessments, such as size, shape, extent, depth, and type of weld defects for virtual inspection.

For machine learning, some implementations use sequencing model to extract unsupervised arc and electrode anomalies. Some implementations use auto-regressed unsupervised anomalies from the weld image signal patterns. Some implementations isolate signals that are not part of random noise signal and indicate events. Some implementations facilitate manual inspection of images and physical weld to annotate digital model with defect information. Some implementations generate descriptor of weld pool shape from contour. Some implementations utilize unsupervised classification models (e.g., recurrent neural networks) to identify different weld feature types. Some implementations quantify weld pool classifications over a spatial region (e.g., 1 cm of build length). Some implementations create a statistical fit based on location of ex-situ inspection of welds. Some implementations train a supervised neural network to classify defect types annotated from the video input, automatically extract engineering features.

In some instances, some implementations use stochastic volatility modeling techniques for modeling defects. Some implementations combine models and remove any random component to produce the anomalous component. Some implementations use stationary space model with autoregressive model.

Some implementations use WaveNet (developed by Deep Mind), a generative Recurrent Neural Network meant for audio sequences, with gates in the network, to model layered effects. Some implementations use the neural network for training the autoregressor, applied instead to a video image stream of a particular electrode event. Some implementations use WaveNet in combination with an error term as defined by Equation (1) below:

$$\Delta y_h{}^\wedge = f(\Delta y_{t-1}{}^n \ldots \Delta y_{t-k}{}^n) + \varepsilon \tag{1}$$

Some implementations use a batched stochastic gradient descent (SGD) algorithm.

In some implementations, the error term is modeled with a kernel density estimator as defined by Equation (2) below:

$$G_h(\varepsilon) = 1/n \Sigma K_h h(\varepsilon - \varepsilon_i), \text{ for } i=1 \text{ to } n \tag{2}$$

Some implementations divide the error that fits a random pattern from this error model as defined in Equation (3) below, and the remaining quantity or what is left is the anomaly detected.

$$Z_i = \varepsilon_i / G_h(\varepsilon_i) \tag{3}$$

Examples of Image Acquisition Systems and Methods

Figure 6B:
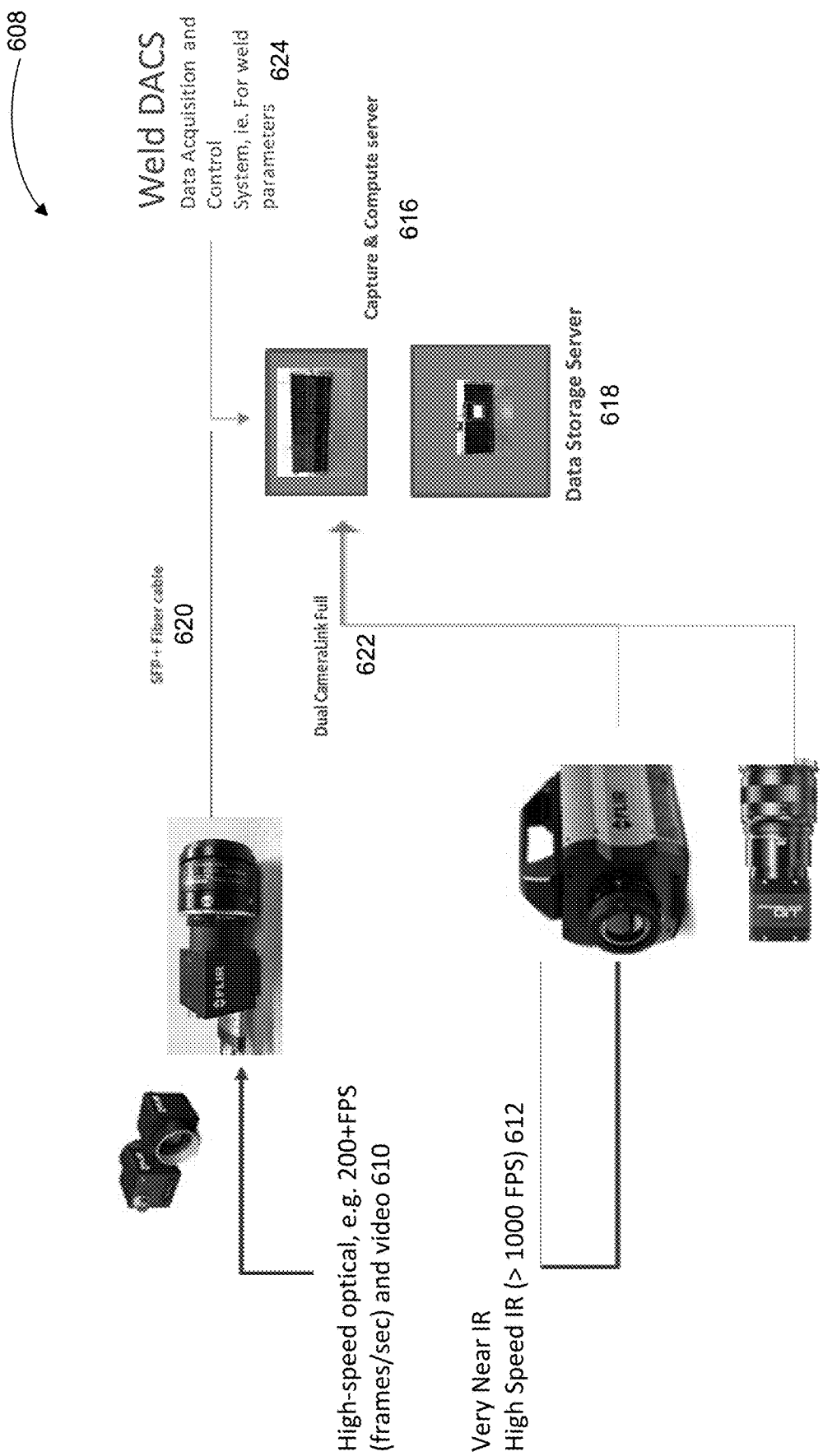
FIG. 6B shows example camera systems (or image acquisition systems), according to some implementations.

FIG. 6B shows an example camera system (or image acquisition system) 608, according to some implementations. In some implementations, a camera capture system is placed in the vicinity (e.g., 1'-5'), on a tripod or on a mount fixed to a robot arm, or affixed to a rigid surface from above, or otherwise placed in a location, with visibility to a weld section. The camera system 608 collects imagery and/or video of a weld in progress. In some implementations, weld images record patterns and behavior of weld events, such as weld pool shape, size, intensity patterns, contours, depth, thermal gradients, changes over time, uniformity, spatter, alignment, and other hidden variables and interactions not explicitly defined as inputs, ultimately used to determine a relationship to final as-welded qualities. Some implementations use a high-speed optical camera or video camera 610 (e.g., a camera capable of capturing 200 FPS (frames/sec)) and transfer images (e.g., using a SFP and/or filter cable 620) to an image capture and compute server 616. Some implementations use a very near infrared (IR) or high speed IR camera (e.g., a camera capable of capturing 1000 frames per second) 612 and transfer images (e.g., using a Dual CameraLink Full 622) to the image capture and compute server. Some implementations use a high-speed optical camera (e.g., a camera capable of producing 1080 resolution video) to transfer images to the image capture and compute server. In some implementations, the image capture and compute server 616 integrates weld parameters from a weld data acquisition and control system (weld DACS) 624 and stores the resulting data to a data storage server 618.

Some implementations include a high-speed IR camera (e.g., FLIR x6900sc MWIR), a high speed optical camera (e.g., Blackfly 0.4 MP/522 FPS), operational optical cameras, and/or a video camera (e.g., a 1080p camera) to capture images of a range of welding features to maximize predictive power for a single test. Some implementations use a single camera streamlined for the appropriate application. In some implementations, the high-speed cameras have framerates from 200 FPS to 1000 FPS, or frame rates sufficient to capture fleeting features from which weld quality event predictions can be made, given the speed of the torch and nuances of the material. For example, an e-beam welding operation requires faster frame rates to capture faster melt pool creation and cooling patterns. For conventional welding, with cooling rates close to 1 second, the rates can be lowered accordingly, but the cameras continue to capture weld pool behavior over time at higher resolution. Some implementations use deep "transfer" learning after initial data capture of basic features to reduce size and type of camera required after training the basic algorithm. Some implementations use existing patterns, so that smaller cameras (than the ones used during training) collect less extensive data sets for weld determination. Some implementations use high resolution Near-IR, as well as thermal and optical cameras (Blackfly 522 FPS operating at nearly 200

FPS) that are cheaper than the FLIR. These cameras are often cheaper and easier to mount for different applications. Some implementations use the base high-speed IR data set to validate. Some implementations use camera(s) mounted with coaxial alignment to the weld direction. Some implementations use data stitching or image processing, to restore proper dimensions and alignment for data model visualization and/or quantification.

Some implementations use multiple computer vision processing methods to predict welding quality features, depending on the complexity of the features of interest. Some implementations use mathematically defined weld pool shape characterization to create statistical model/linear fit that correlates weld pool shape with degree of weld quality. Some implementations use a deep learning model trained to detect good/bad weld regions based on raw images annotated with inspection results. Some implementations use different models in conjunction with a 3D visualization of the as-welded result. Some implementations use actual imagery to capture the actual boundaries of the weld pool shape, and other parameters, weld events and patterns captured in sequenced imagery of an in-progress welding process.

For image sensing, some implementations use a high speed optical camera (e.g., a 200 FPS camera) to capture and infer electrode spatter, weld pool changes, arc patterns, and/or a 1080p camcorder with laser light for profiling weld depth and weld evolution patterns. Some implementations utilize high-speed infrared camera (e.g., a 1000 FPS camera) to observe weld process.

Some implementations use thermal or infra-red camera(s) to monitor welding processes. Some implementations capture heat signature of both molten metal and surrounding solid surfaces. Some implementations predict weld penetration and porosity. Some implementations utilize full IR and optical images including solid metal surfaces and solidified weld trail. Some implementations utilize optical camera to inspect weld bead, and/or void modeling. Some implementations use 3-D multi-pass weld volume and shape analysis, with confirmed defect match. Some implementations apply deep learning to images of welds to identify defects. Some implementations identify contour of weld using thresholding and/or edge detection methods. Some implementations calculate true weld pool area and shape using computer vision methods to create statistical models. Some implementations apply machine learning techniques to annotated images of weld bead to classify defects. Examples of thermal imaging are described below in reference to FIG. 7J, according to some implementations.

Some implementations provide early warning and augmentation to inspection, based on detecting in-process or in-situ (as opposed to or in addition to post weld inspection of), weld features, that lead to defects. In some implementations, the weld may be stopped at the time of defect, saving wasted processing and inspection delay by fixing the defect on the spot. Some implementations facilitate easier or cheaper weld repairs. For example, weld repairs are removed via grinding, but if defects are found after the completed product, then defects can be buried several inches deep, and will require extensive work to remove. Some implementations facilitate informing NDE of trouble areas to focus, identifying problems with precision. Some implementations facilitate diagnostics and improve interpretability of features. Some implementations improve understanding and visualization of welding quality. Some implementations include time-event information to trace any feature back to the conditions that caused a defect (or defects), which is not possible with post-processing inspection separated from these conditions. Some implementations facilitate inspection of only those defects which are marked as potential defects (rather than inspection of every feature of a product, for example). Some implementations perform image reconstruction to augment incomplete or "fuzzy" NDE to prevent rework. In some implementations, the techniques described herein help replace post-weld inspection techniques with automated inspection during the weld. Some implementations facilitate traceable as-welded capability for future investigation, simulation, or records on conditions that lead to defects. In some implementations, although weld quality can be initially verified with an NDE, after an initial inspection, further inspection becomes unnecessary. In some implementations, images obtained from an in-progress weld process are processed with a deep neural network that detects and quantifies loosely-trained features of the weld seam as it is being welded. Some implementations automatically capture and draw attention to quality features vaguely similar but not explicitly defined or seen before. Some implementations facilitate automated decision making using weighted parameters and probabilities to steer the control variables within allowable limits. Some implementations improve precision, repeatability, and/or reproducibility of weld quality inspection.

In some implementations, the camera and data extraction algorithm provide weld characterizing information that is more accurate and reliable compared to human observation, and is comparable to information obtained using NDE, while at the same time avoiding any noise, material, or geometry that are inherent in post-processing NDE. Some implementations automatically quantify defect rate using in-situ system and correlate to changes in automated welding process parameters. Some implementations reduce amount of manual inspection and increase accuracy by assisting human operators in identifying defect regions.

Some implementations use high speed IR time series mapping. Some implementations track temperature intensity, melt points, temperature and cooling profile, and/or weld beam movement. Some implementations detect features from NIR, high speed IR, and/or optical cameras. Some implementations perform deep learning algorithms on unsupervised feature extractions of e-beam weld quality features, and correlate the information with CT scan results of the weld. Some implementations predict weld penetration depth.

Some implementations use a fixed welder on a rotating or stationary weld platform. Some implementations use a high speed optical camera mounted on a tripod situated close to the weld platform. Some implementations provide a plastic shield (or a similar apparatus) to prevent sparks from damaging the lens of a camera. Some implementations utilized inert gas weld box. In some implementations, a computer attached to the camera and/or welding equipment records data from the IR camera during a normal weld operation. In some implementations, external inspection/testing is used to identify locations of weld quality defects and high quality regions to correlate with captured data. Some implementations use an HSIR camera and image processing techniques to image welding processes to predict weld quality issues. Some implementations predict weld penetration depth.

In some implementations, weld motion is synchronized with respect to the camera. For example, the camera is mounted on a non-stationary tripod. Some implementations use coaxial mounting with weld arm. Some implementations cause the camera(s) to zoom in (e.g., with high resolution)

on a weld event or location. Some implementations focus on weld pool and/or cooling at all times, providing a frame of reference. Some implementations reduce complexity of image processing by not accounting for motion.

Some implementations use thermal cooling gradients. In such instances, the material welded must be emissive so that an NIR camera (with a high enough frame rate) can capture images of the welding process. For example, some implementations use a 50 MP high speed optical and NIR camera, with filter. Some implementations use a FLIR high speed IR camera (e.g., when cooling faster than 1 second). Some implementations use smaller thermal cameras depending on frame rate required. Some handheld cameras are lighter, and may be used by human inspectors. In some implementations, images captured by the camera are analyzed by a computer system (e.g., a system applying machine learning algorithms) to identify welding defects in real-time or when welding is in progress. Some implementations monitor one or more welding parameters, including transverse speed, rotation, gas flow, and any control variables that can be correlated to normal or good welding.

Example Data Preparation

Some implementations perform coded image processing registration, data cleaning, and/or alignment. Some implementations use lens selected for proper focal length to capture these effects. Some implementations convert imagery to multi-dimensional arrays representing pixel intensity, color (if needed).

Some implementations use Convolutional Neural Networks (CNNs) or non-linear regression techniques. Some implementations use a time series auto-regressor. Some implementations train a model against a spectrum of "good" and "deviation" welds, representative of many different types. Some implementations do not require that all features are explicitly defined.

In some implementations, a neural network model learns to predict acceptable welds even if presented with a condition (or image) not explicitly seen before. Some implementations recognize sub-patterns (e.g., a low level pattern) or a pattern based on a complete or a whole weld image, and probabilistically assign new features (i.e., features not seen before during training) quality characteristics that have been defined as a basis by a user.

Some implementations detect features and patterns from input imagery, assemble data across an entire weld event, then assign significance to patterns imaged, and perform automatic extraction of engineering features and interactions of statistical significance for optimal characterization, imaging, and prediction of quality from the weld process.

Some implementations integrate process parameter data from the welder including shield gas flow rate, temperature, and pressure, voltage, amperage, wire feed rate and temperature (if applicable), part preheat/inter-pass temperature, and/or part and weld torch relative velocity.

Example Computer Vision Applications

In some implementations, one or more sensors monitor a puddle shape (during a welding process) as well as events and features, such as deposition of oxide or other contamination with a different emissivity likely to be seen as bright spots, or electrode build-up, deterioration or arc irregularities. Some implementations use filtering and/or camera combinations to highlight image features, such as electrode, arc, or weld pool.

Figure 7A:
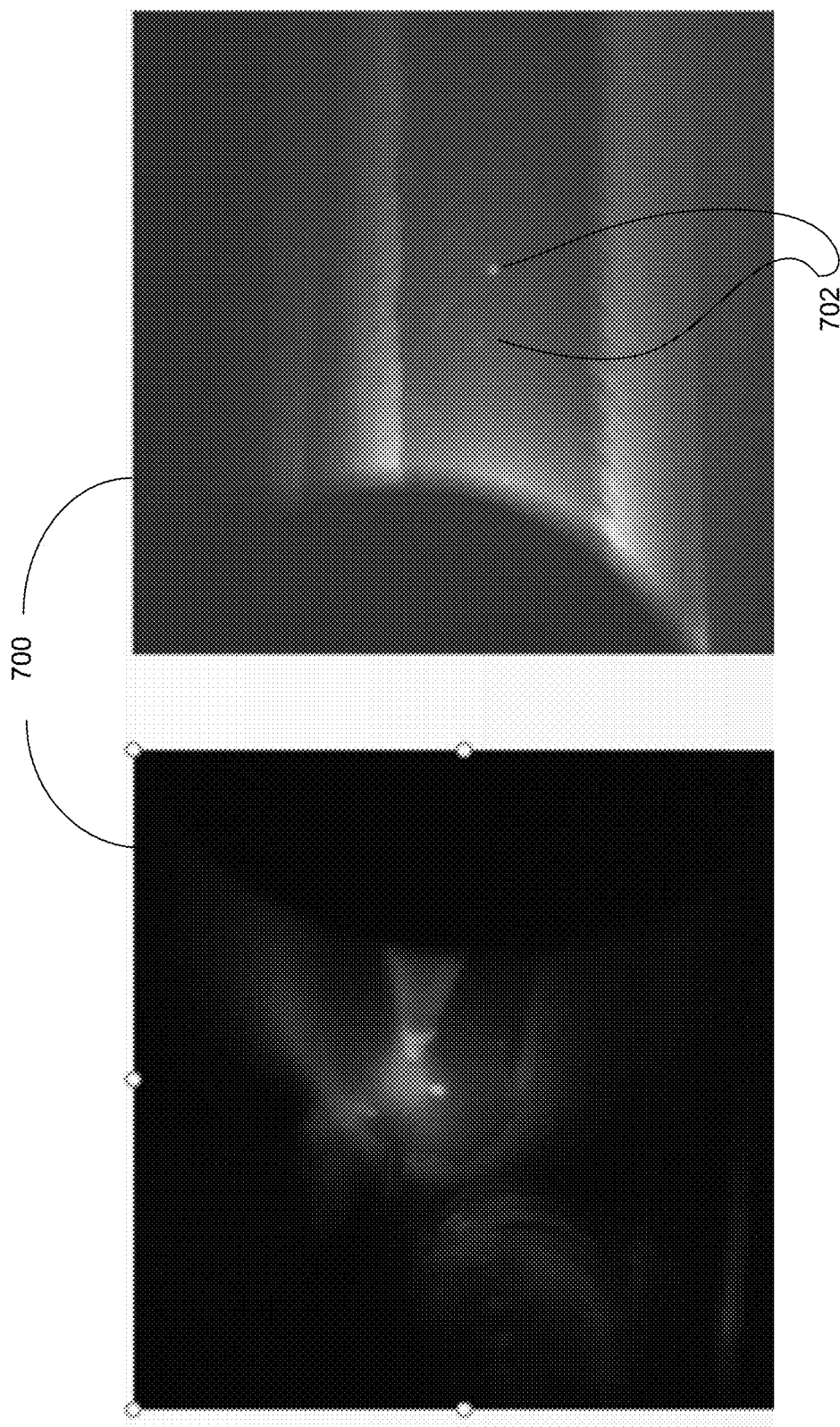
FIG. 7A shows examples of images captured during weld processes, according to some implementations.

In some implementations, images are unrolled in sequence to reveal the weld quality, in different configurations. FIG. 7A shows examples of images 700 captured during weld processes, according to some implementations. FIG. 7A shows bubbles 702 which form on a weld pool surface and periodically stick to the side of the weld pool and cool. In some implementations, algorithms use the imagery to learn good weld patterns and isolate anomalies, and/or to learn defect patterns to identify poor quality events. Some features may remain visible as the weld pool solidifies for characterization.

Figure 7B:
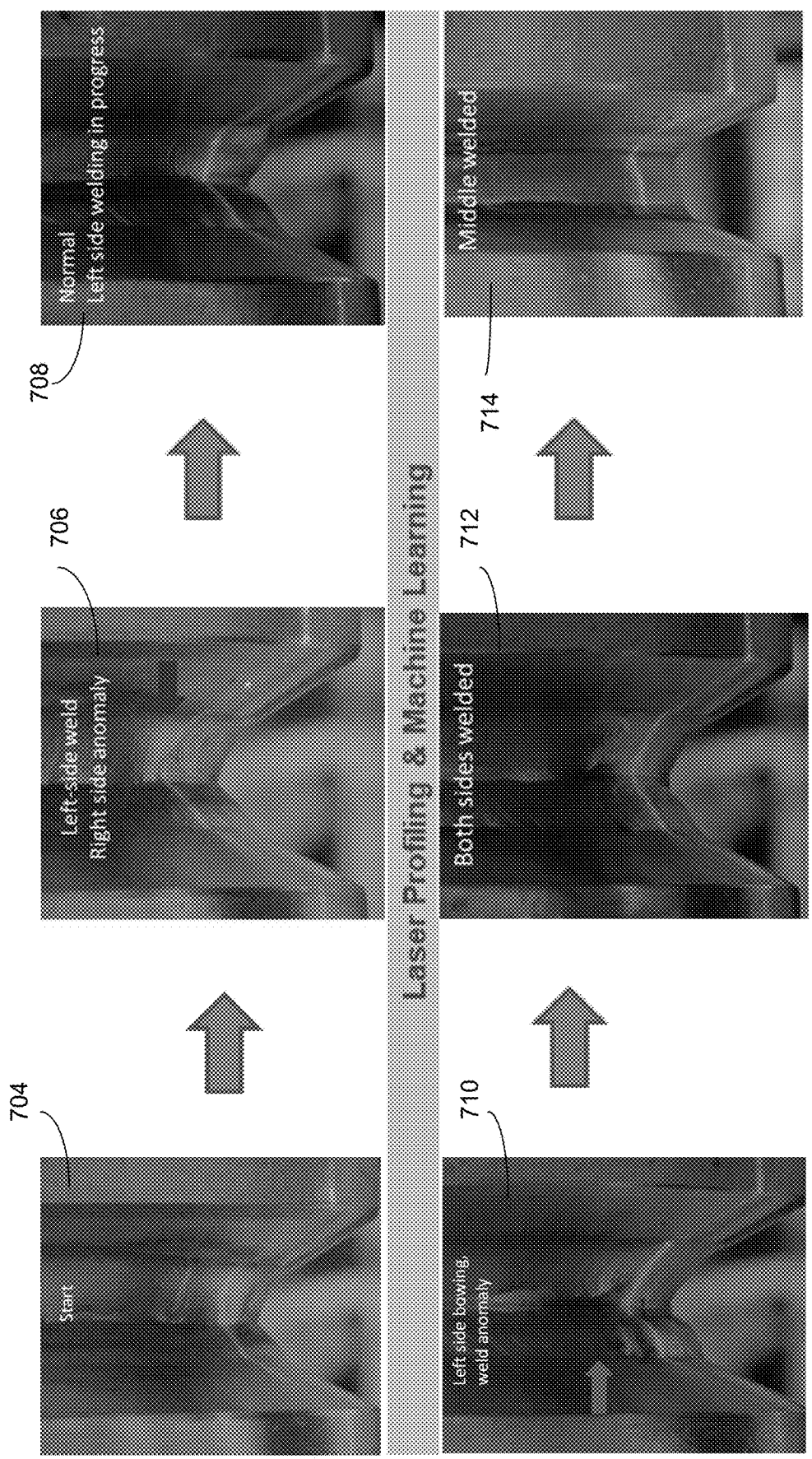
FIG. 7B shows an example process for using laser profiles and weld imagery to infer weld quality, according to some implementations.

FIG. 7B shows example images of a weld process, according to some implementations. The image 704 labeled with 'Start' corresponds to an initial state of a welded material. The next image 706 shows a left-side weld and an anomaly on the right side. The following image 708 shows a normal state where the left side welding is in progress. The next image 710 shows left side bowing (or bending), a welding anomaly. The next images 712 and 714 correspond to when both sides are welded and when the middle is welded, respectively.

Figure 7C:
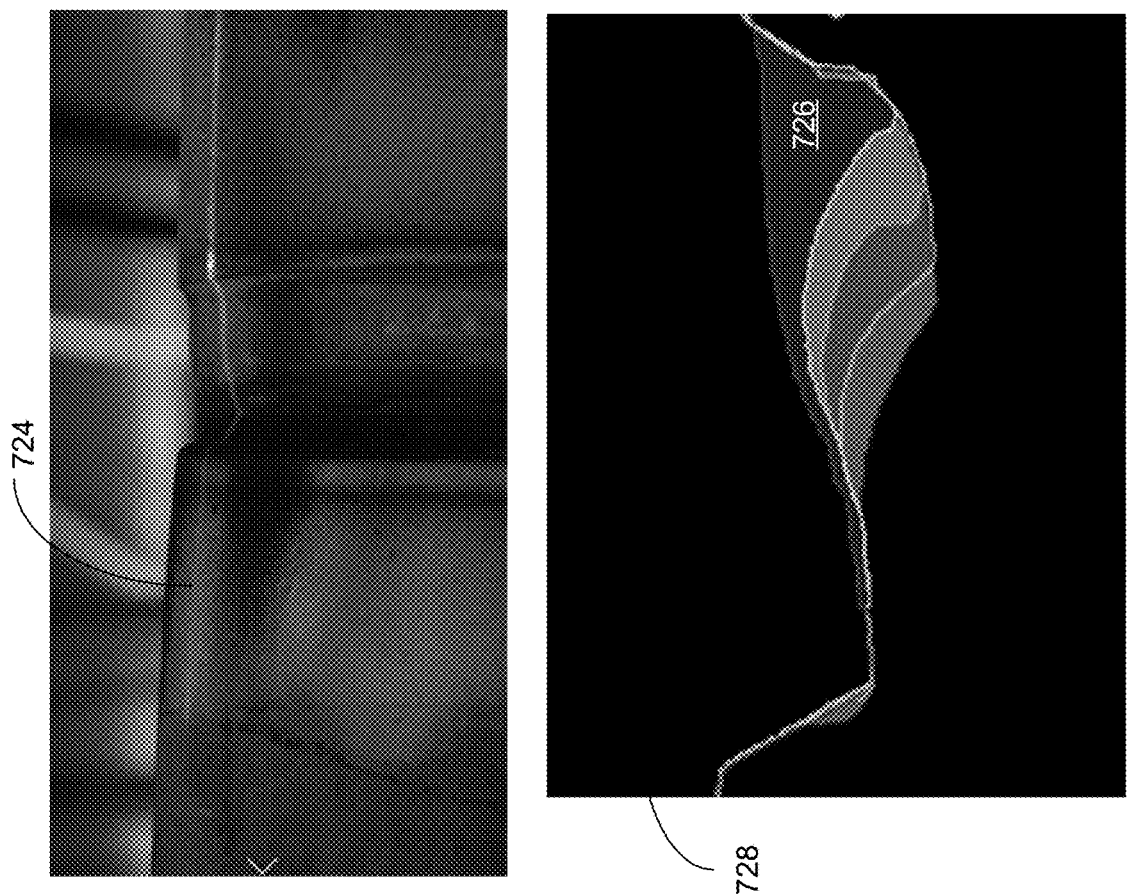
FIG. 7C shows an example digital data model process for using laser profiles and weld imagery to infer volumetric weld quality by consistency of weld pass melt volume, according to some implementations.
Figure 7C:
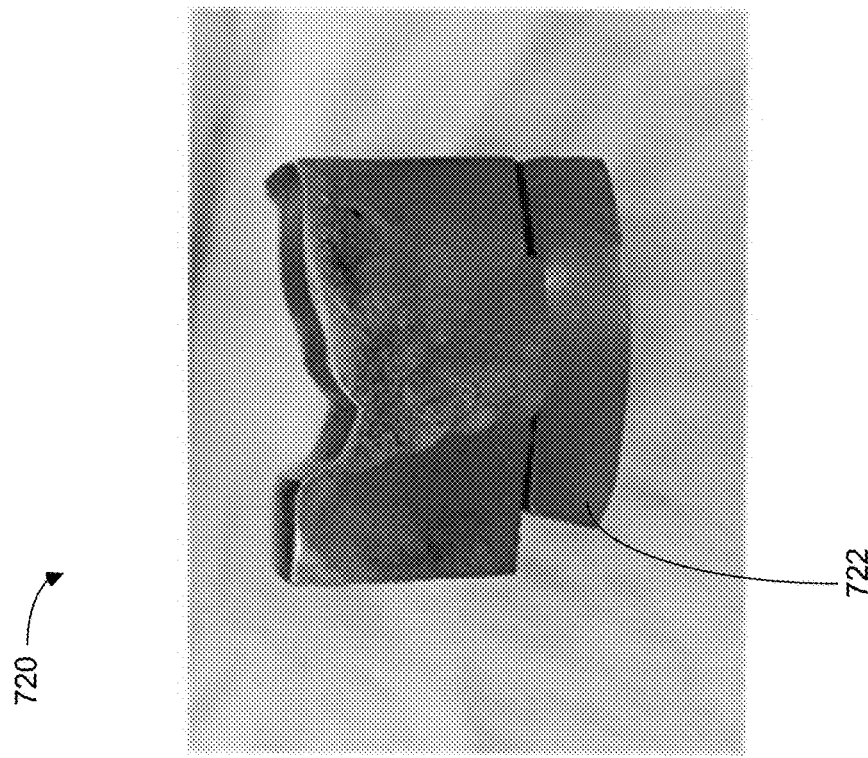

FIG. 7C shows an example process 720 for using laser profiles to infer weld quality, according to some implementations. Some implementations use laser light projected onto a post-weld surface 722 to provide a 3-D profile 724 of weld surface and voids. Some implementations perform bead volume analytics 728 based on video capture. In FIG. 7C, the red bead 726 is higher volume than the other three colors or bands, and misshapen, indicating an out-of-bead condition. Some implementations determine volume and shape of the red bead. Some implementations use a chunk of the weld to examine physical defects. In some implementations, this type of defect is related back to volume and shape of an analytical digital twin (e.g., the red region 726).

Figure 7D:
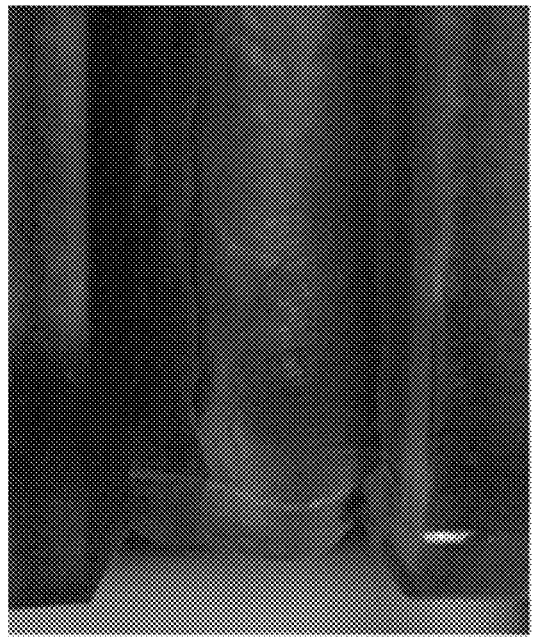
FIG. 7D is an example illustration of profile progression under different weld conditions, to be interpreted by a machine learning algorithm, according to some implementations.
Figure 7D:
Figure 7D:
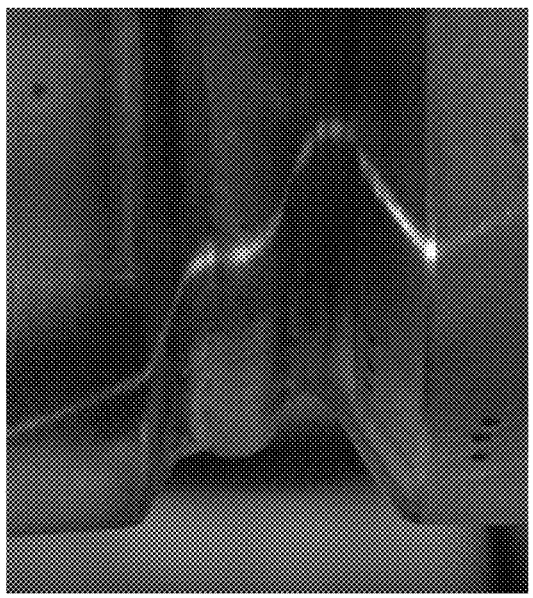
Figure 7D:
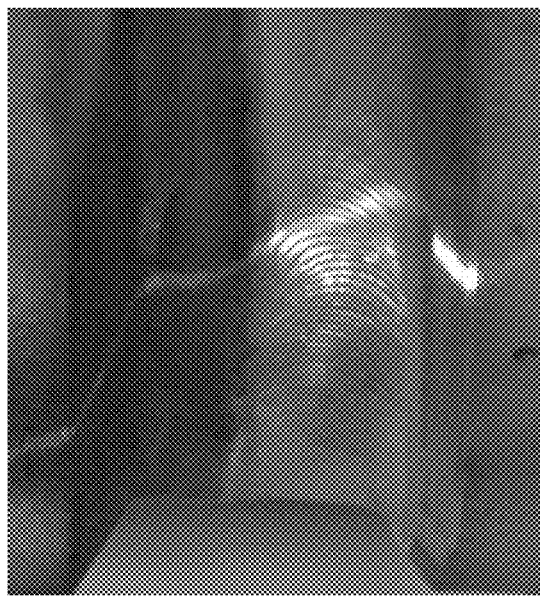

FIG. 7D is an example illustration of profile progression 730, according to some implementations. Some implementations use laser profile to train a machine learning algorithm and to parameterize the profile and alignment related quality features during a welding process. In some implementations, laser profile progression is performed perpendicularly (i.e., the profile plane is perpendicular to a welding plane). In some implementations, to enhance the learning pattern, laser profile progression is performed at an angle to the welding plane.

Figure 7E:
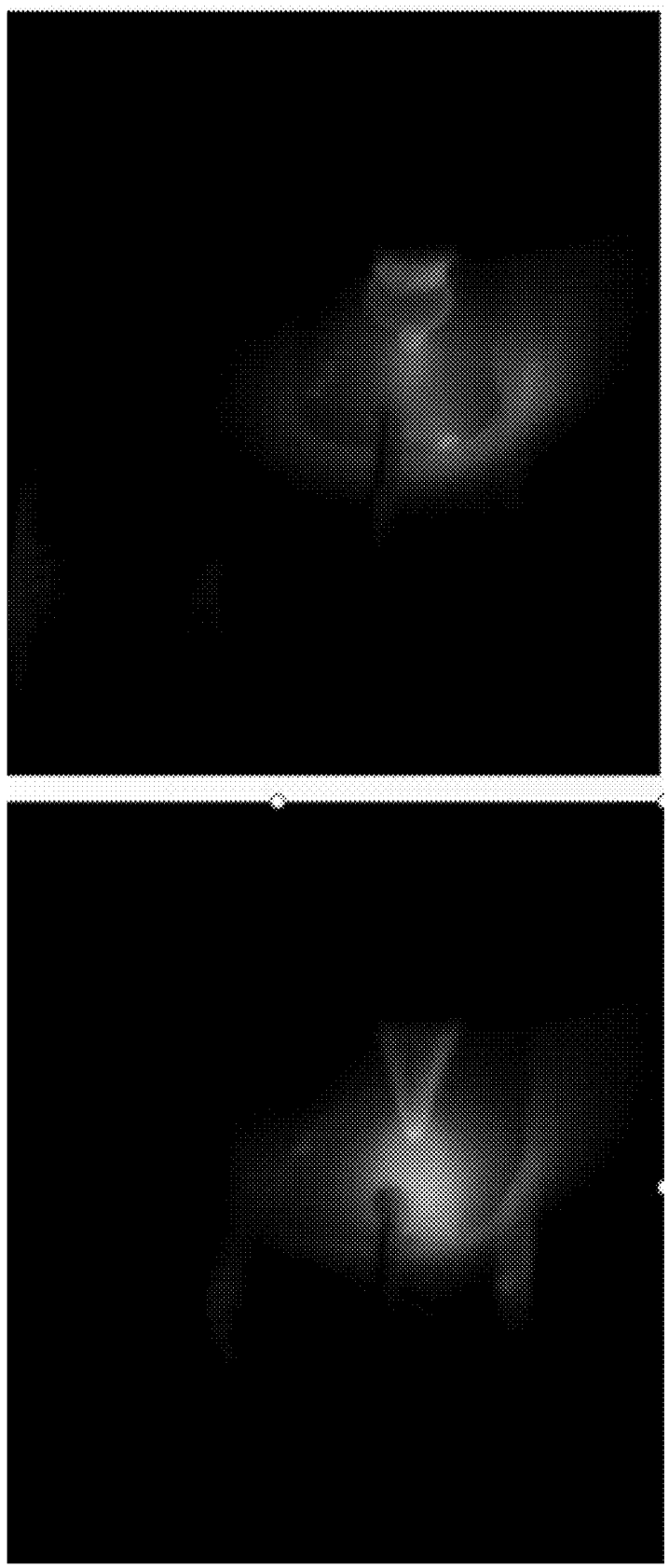
FIG. 7E shows example images of electrode events, according to some implementations.
Figure 7F:
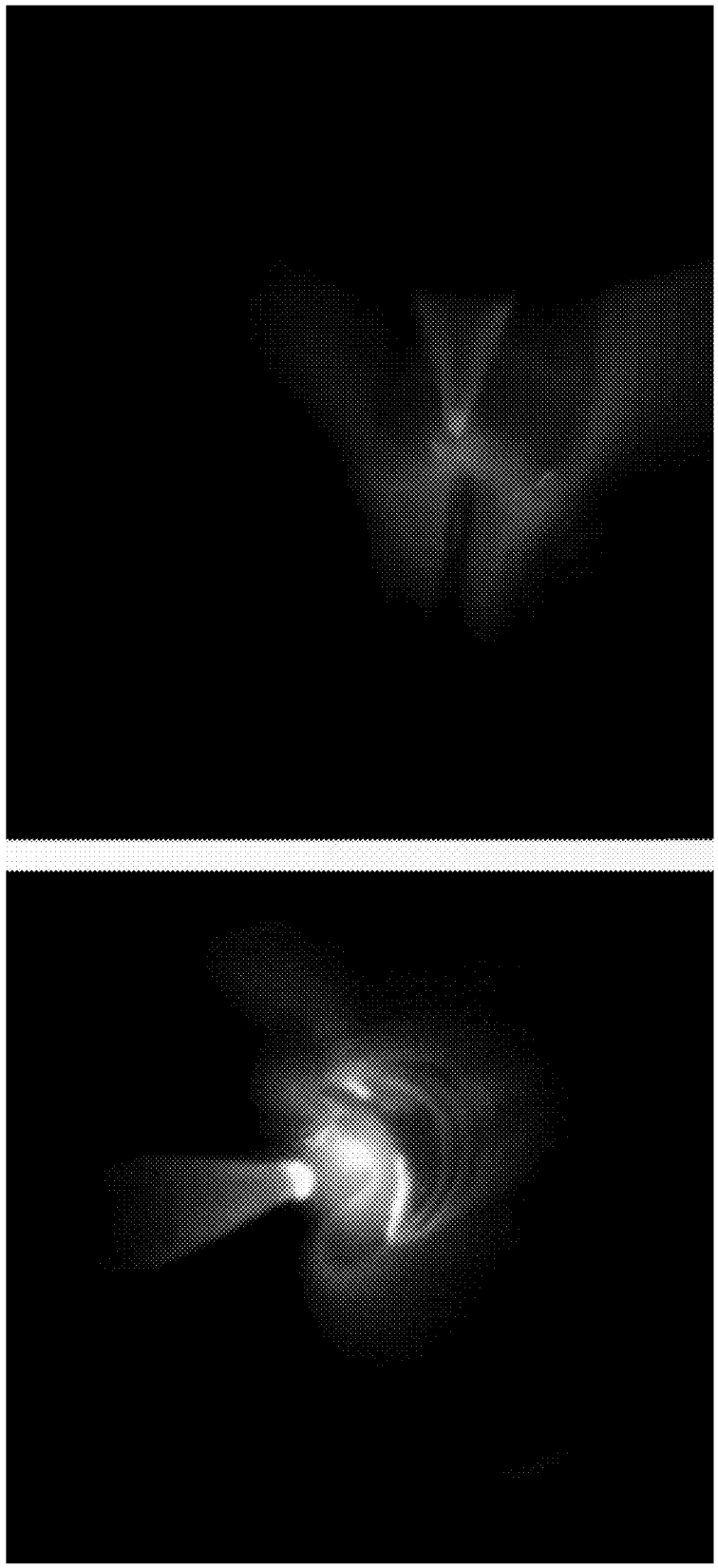
FIG. 7F shows example images of weld pool and arc events, according to some implementations.
Figure 7G:
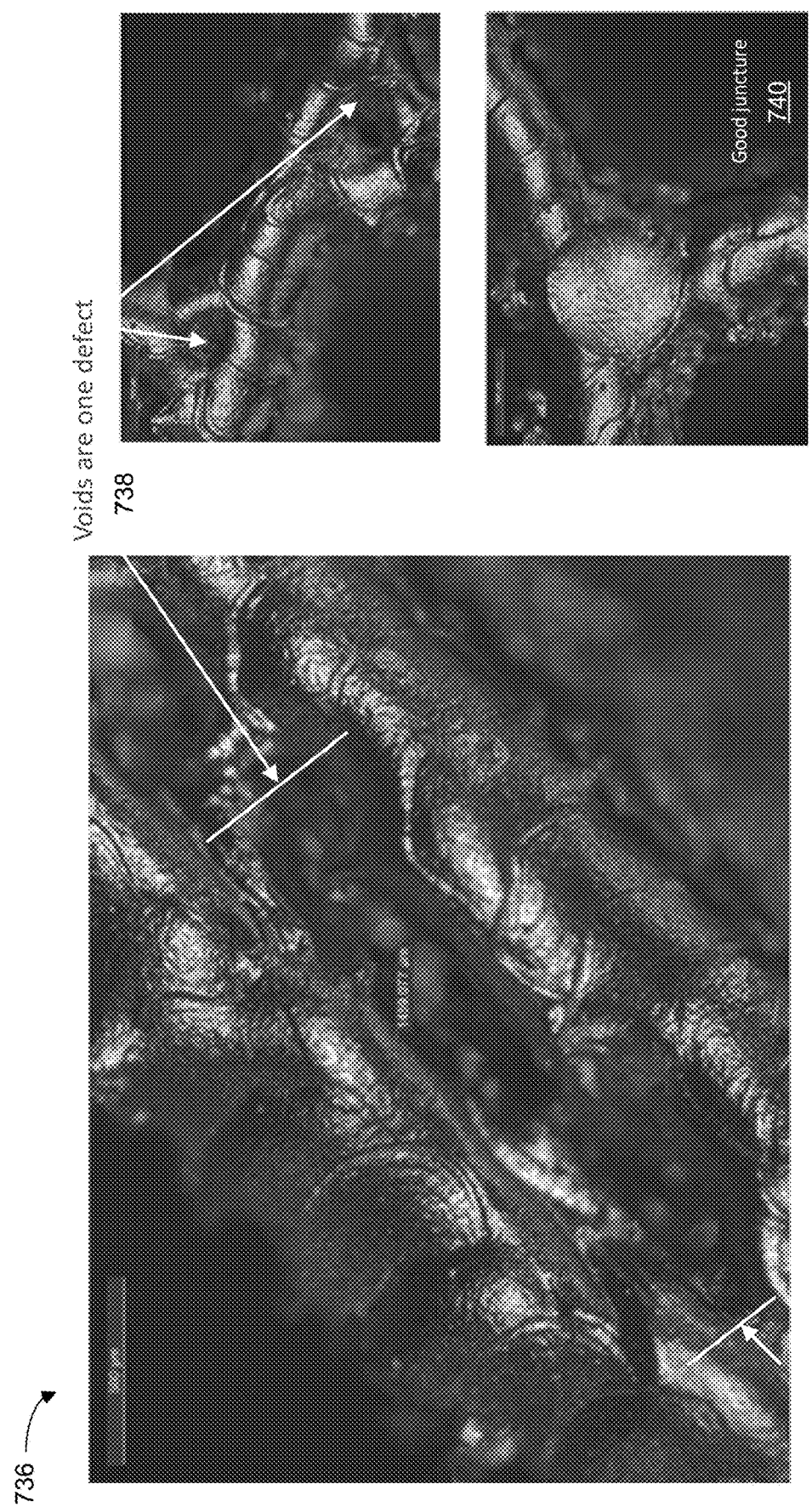
FIG. 7G shows example images of micrographic inspection of welds and weld defects for the purposes of training algorithms on defect recognition, according to some implementations.
Figure 7H:
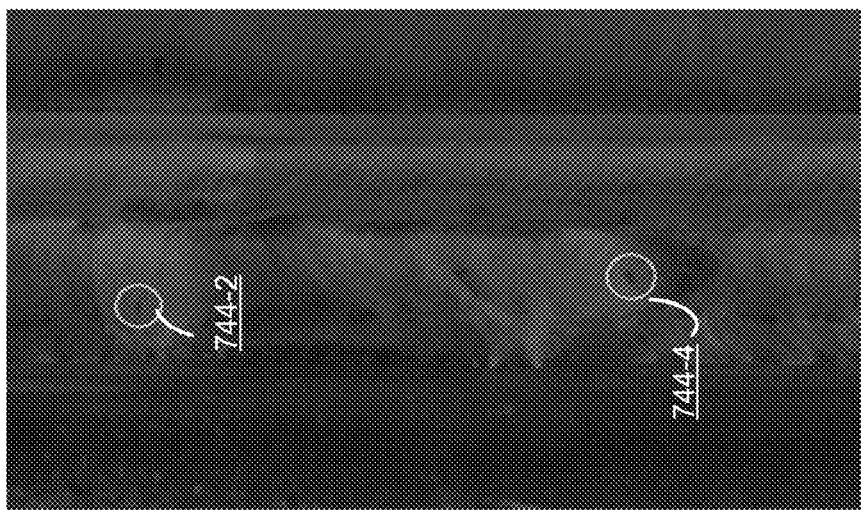
FIG. 7H shows unrolled (or flattened) images from a circular weld, for the purposes of machine learning pattern and defect recognition, according to some implementations.
Figure 7H:
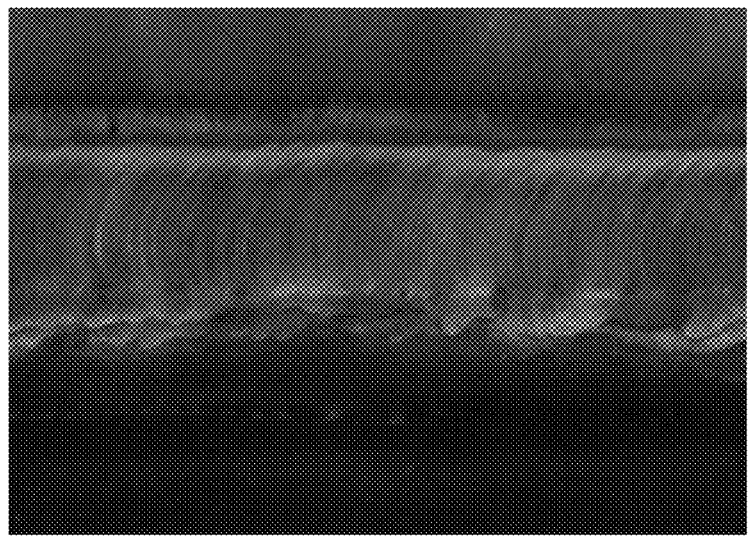
Figure 7H:
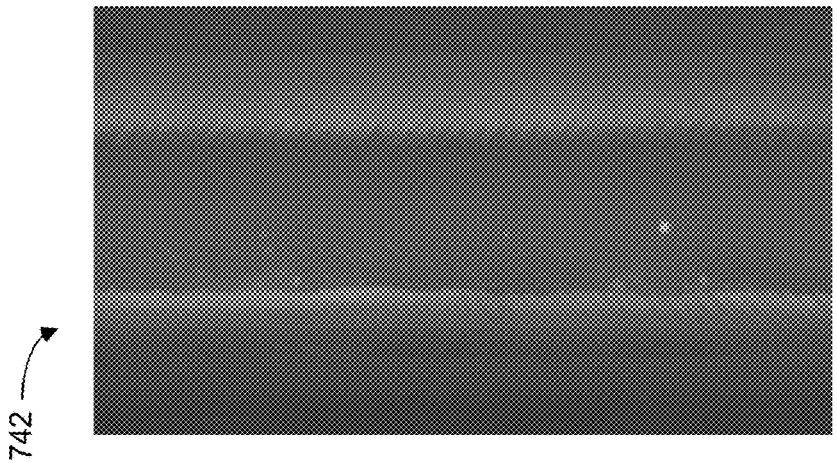
Figure 7I:
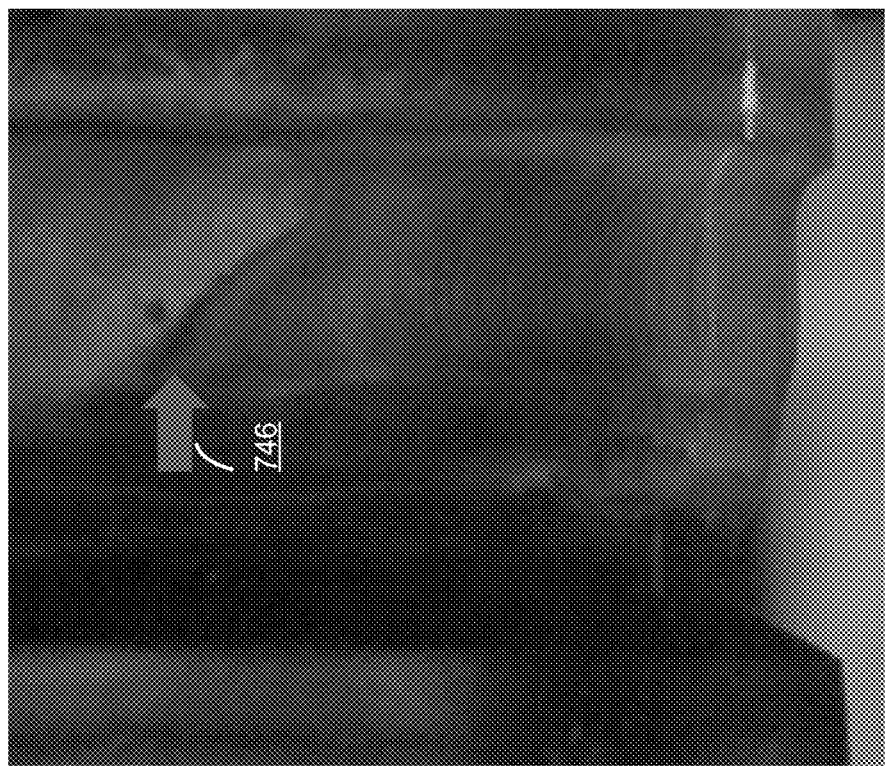
FIG. 7I shows confirmation of weld defects according to some implementations.
Figure 7I:
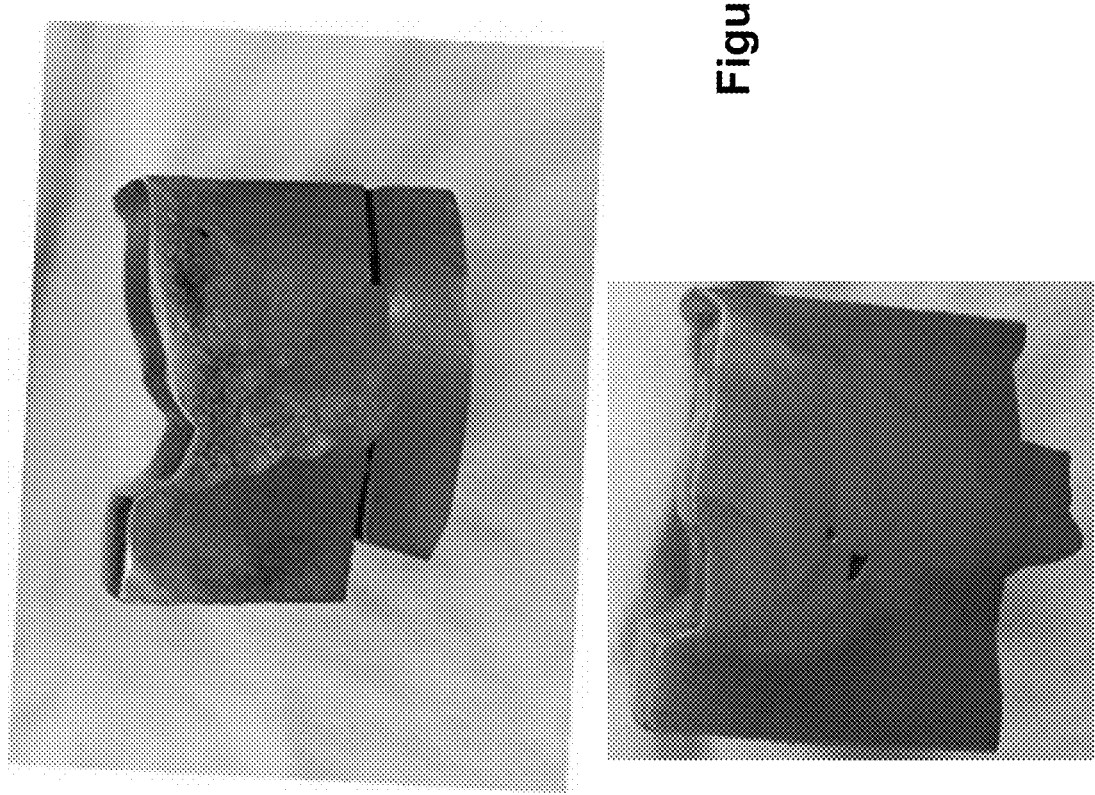

FIG. 7E shows example images 732 of electrode events, according to some implementations. FIG. 7F shows example images 734 of weld pool, arc events, according to some implementations. The example shows lack of fusion, due to subsurface porosity and subsurface void, causing metal flows out of weld pool into channel (red region on graphic in FIG. 7C), according to some implementations. FIG. 7G shows example images 736 of an in-progress weld with defects, according to some implementations. In particular, the defects shown include voids (one type of defects) 738. In some implementations, micrographs of welds are used to train a machine learning algorithm. Once trained, the machine learning algorithms use images that capture weld pool shape, cooling profile, etc. of an in-progress weld, and/or variables not explicitly defined (but captured in patterns of imagery) to detect conditions that lead to such defects. FIG. 7G also shows an example of a good juncture 740, according to some implementations. Some implementations examples of good junctures and voids to train one or more machine learning classifiers to detect welding defects. Some implementations represent such conditions and/or defects in a digital twin, using appropriate dimensions. FIG. 7H shows unrolled (or flattened) images 742 from a circular weld, according to some implementations. Some implementations identify defects that correlate to voids. Some implementations automatically annotate images (e.g., labels 744-2 and 744-4) with defects or anomalies. FIG. 7I shows confirmation of weld defects 746, according to some implementations.

Figure 8A:
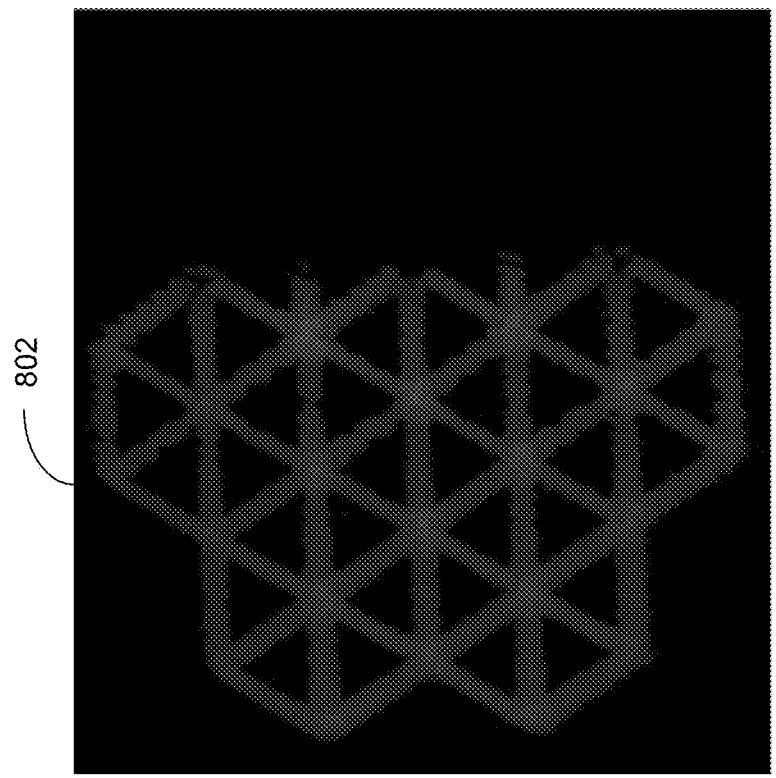
FIG. 8A shows a weld image of an electron beam weld, with resulting digital twin rendition of heat signature pattern, according to some implementations.
Figure 8A:
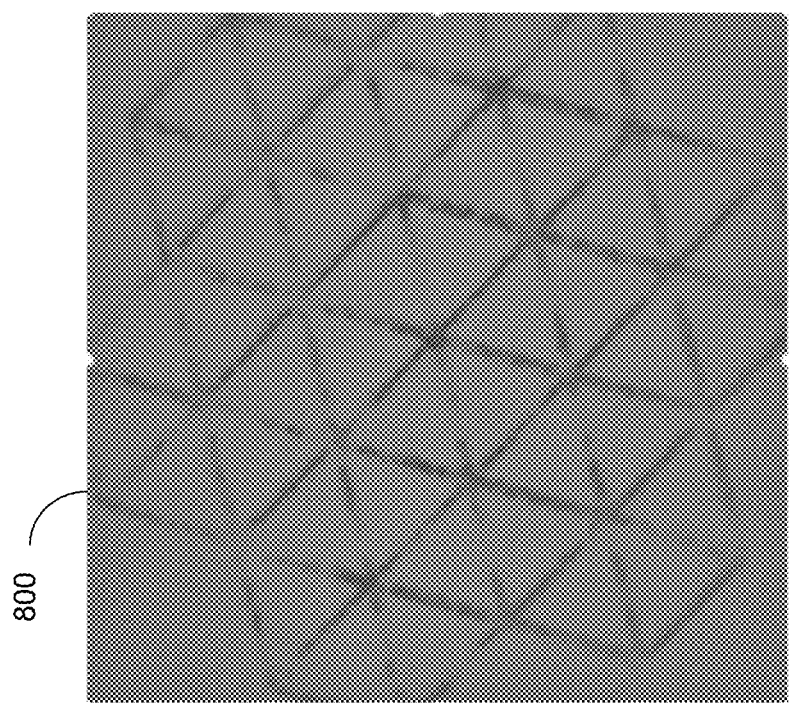

FIG. 8A shows a weld image 800 of an electron beam weld, according to some implementations. In some implementations, sequence of images capture temporal patterns, such as weld shape, speed spatter, thermal pattern. FIG. 8A also shows an example of an-in process image 802 comprising a weld digital twin, with heat profile, according to some implementations. In some implementations, this image is used to form a data layer of a digital twin of the as-welded seam with resulting quality features (e.g. defects).

In some implementations, sequenced images are collapsed back into a 3D digital representation of a (predicted) final state of an in-progress weld. Some implementations show as-welded boundary with end-state quality features (either directly observed or predicted with a confidence level higher than a predetermined threshold (e.g., 90% confidence level)), based on the observed weld conditions and/or events.

Figure 8B:
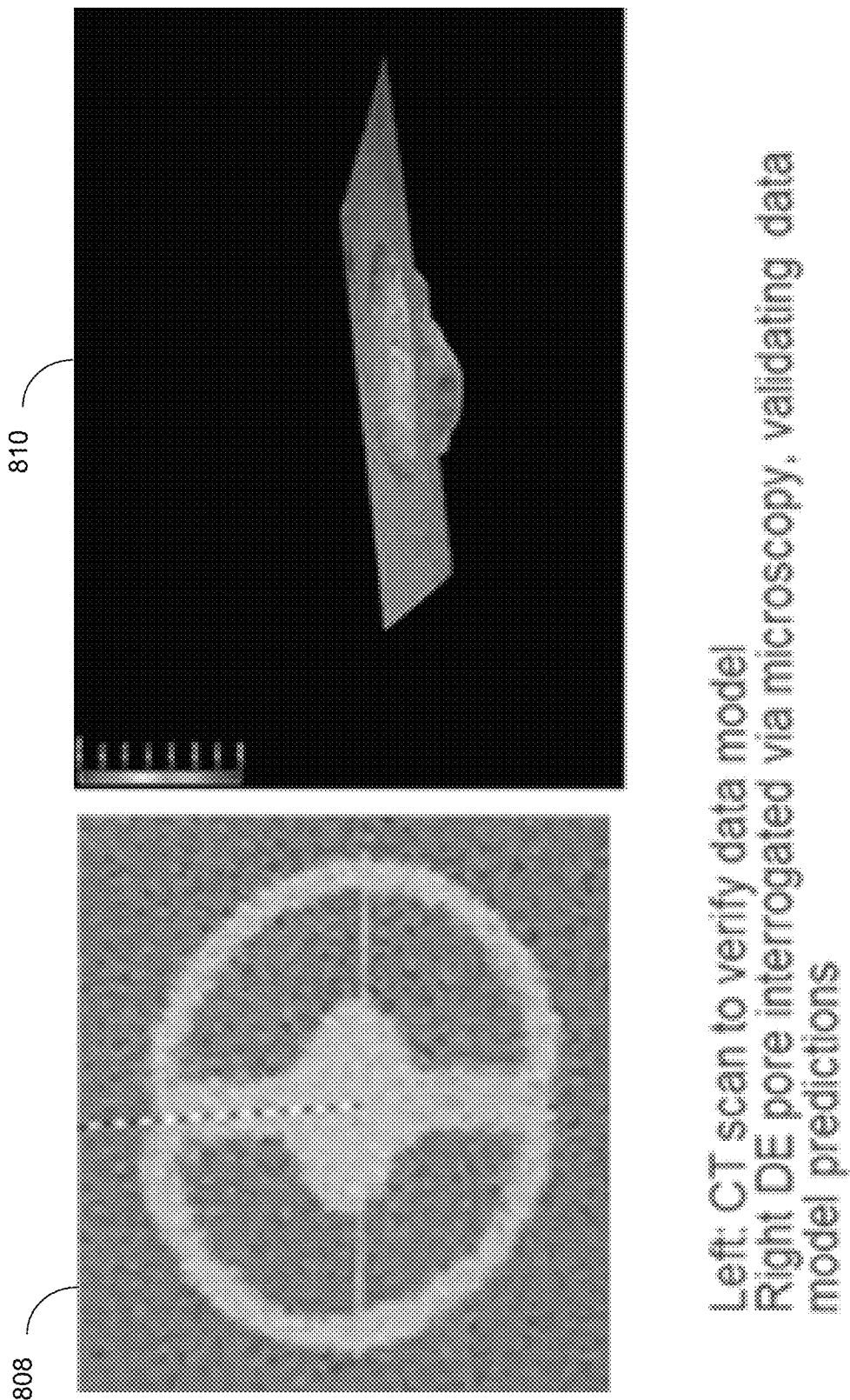
FIG. 8B shows a CT scan to verify data model, and a DE pore interrogated via microscopy, validating data model predictions, according to some implementations.

Some implementations capture texture of weld pool, ripple pattern, and/or shape of weld pool. Some implementations use artificial intelligence to copy and/or automate generation of visual indicators to match requirements of a human inspector. Some implementations analyze cooled state (of welded product) and correlate with images captured during welding to identify causes of welding defects. Some implementations use a time series neural net. Some implementations use scalar data of measured parameters. In some implementations, the camera(s) are calibrated using optical-camera tests with resins and sintering processes. Some implementations produce a digital twin with quality features of interest that matches a CT scan (NDE) and/or DE evaluations (microscopy) in an additive manufacturing application. FIG. 8B shows a CT scan 808 to verify data model, according to some implementations. FIG. 8B also shows a DE (Destructive Evaluation) pore 810 interrogated via microscopy, which illustrates traditional destructive evaluation.

Figure 9:
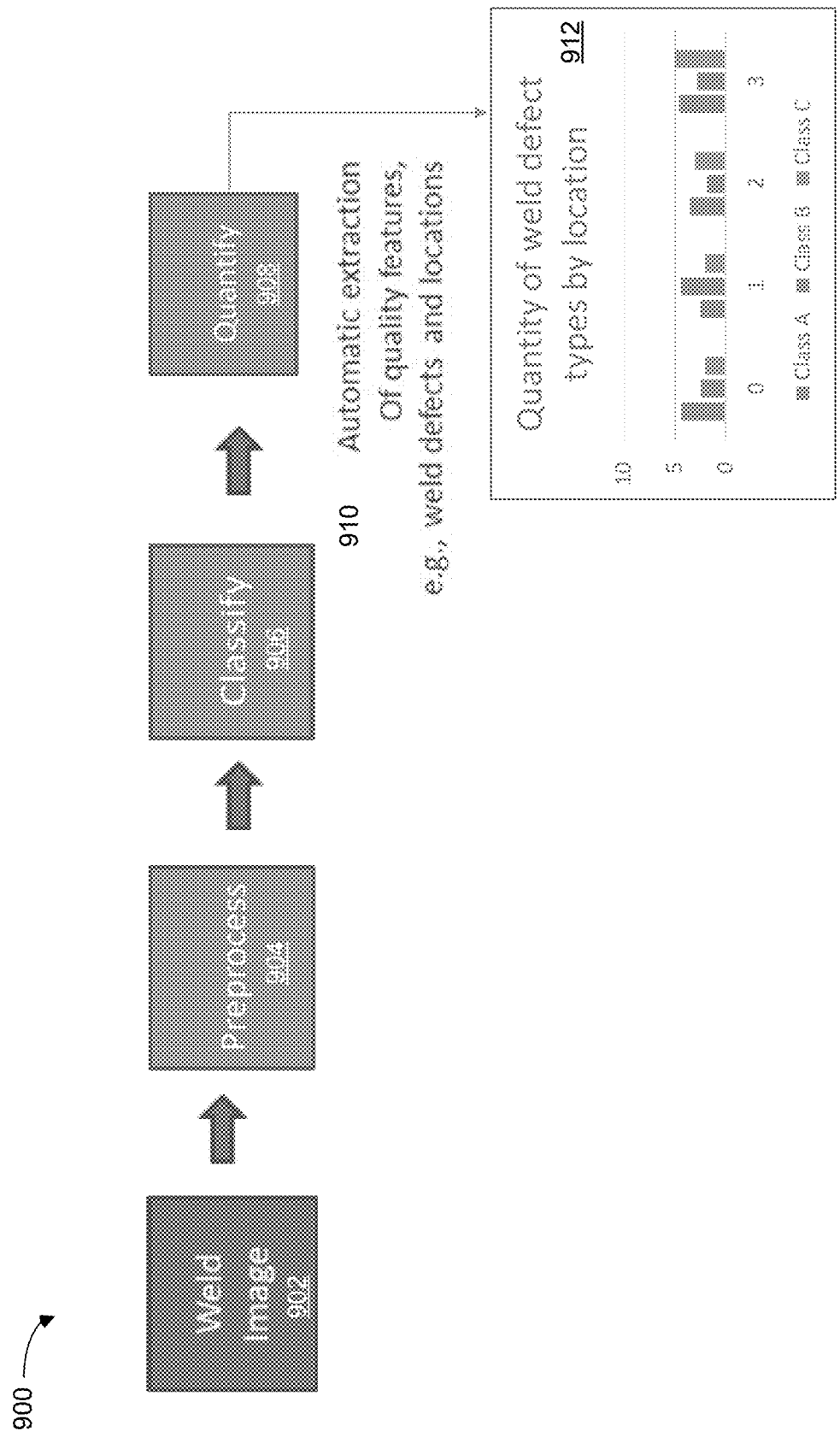
FIG. 9 is an example process for in-situ inspection of an in-progress welding process, according to some implementations.

FIG. 9 is an example process 900 for in-situ inspection of an in-progress welding process, according to some implementations. Weld image(s) 902 are preprocessed (904) and classified (906) before weld quality is quantified (908), and quality features (e.g., weld defects and locations) are automatically extracted (910), and/or visualized. FIG. 9A shows an example visualization of quantity of weld types (or defect types) by location (classes A, B, and C), according to some implementations.

Figure 10A:
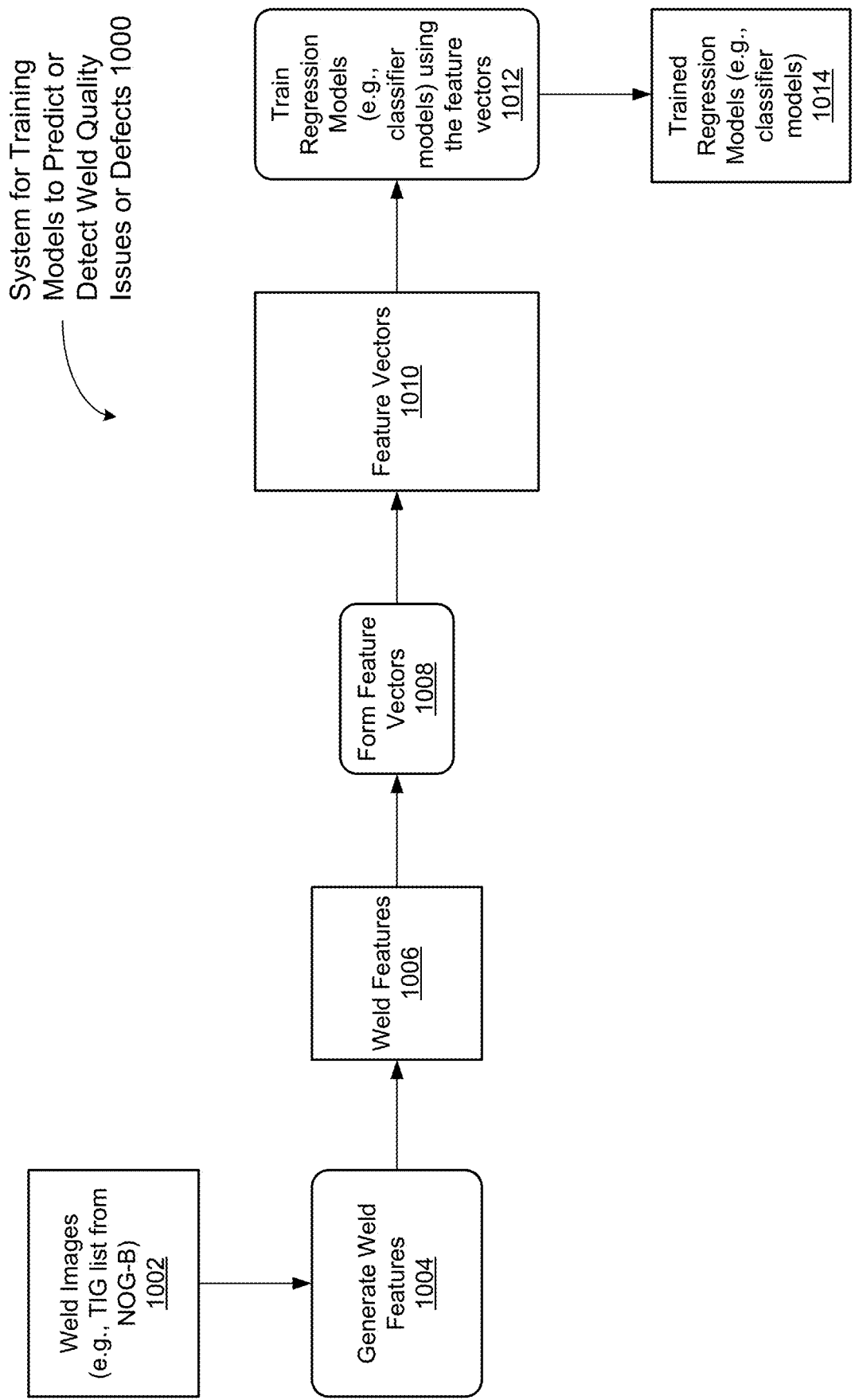
FIG. 10A is a block diagram illustrating a system that trains one or more regression models to predict and/or identify weld defects according to some implementations.

FIG. 10A is a block diagram illustrating a system 1000 that trains one or more regression models (or machine learning models) to predict and/or identify weld defects according to some implementations. Some implementations obtain weld images 1002 (e.g., TIG list from NOG-B) with defects as well as weld images without weld defects. In some implementations, the weld images with or without defects are created artificially so as to train a neural network model.

Some implementations subsequently pass the weld images to a machine learning model. Instead of using a classification model that directly predicts or identifies weld defects, some implementations train a regression model to predict weld defects for an in-progress welding process. Based on the regression model, some implementations identify or predict weld defects, as described below in reference to FIG. 10B.

In some implementations, the method 1000 executes at a computer system having one or more processors and memory storing one or more programs configured for execution by the one or more processors. The method builds regression models 1012 for predicting or identifying weld defects, according to some implementations. The method includes obtaining a plurality of weld images 1002. Each weld image includes either weld defects or good welds (i.e., without weld defects). Examples of weld images are described above in reference to FIGS. 7A-7I, according to some implementations.

The method includes generating (1004) weld features 1006 by extracting features from the weld images 1002 and integrating one or more weld parameters. The method also includes forming (1008) feature vectors 1010 based on the weld features. The method further includes training (1012) a regression model 1014 (e.g., machine learning models described above), using the feature vectors 1010, to predict or identify weld defects.

Figure 10B:
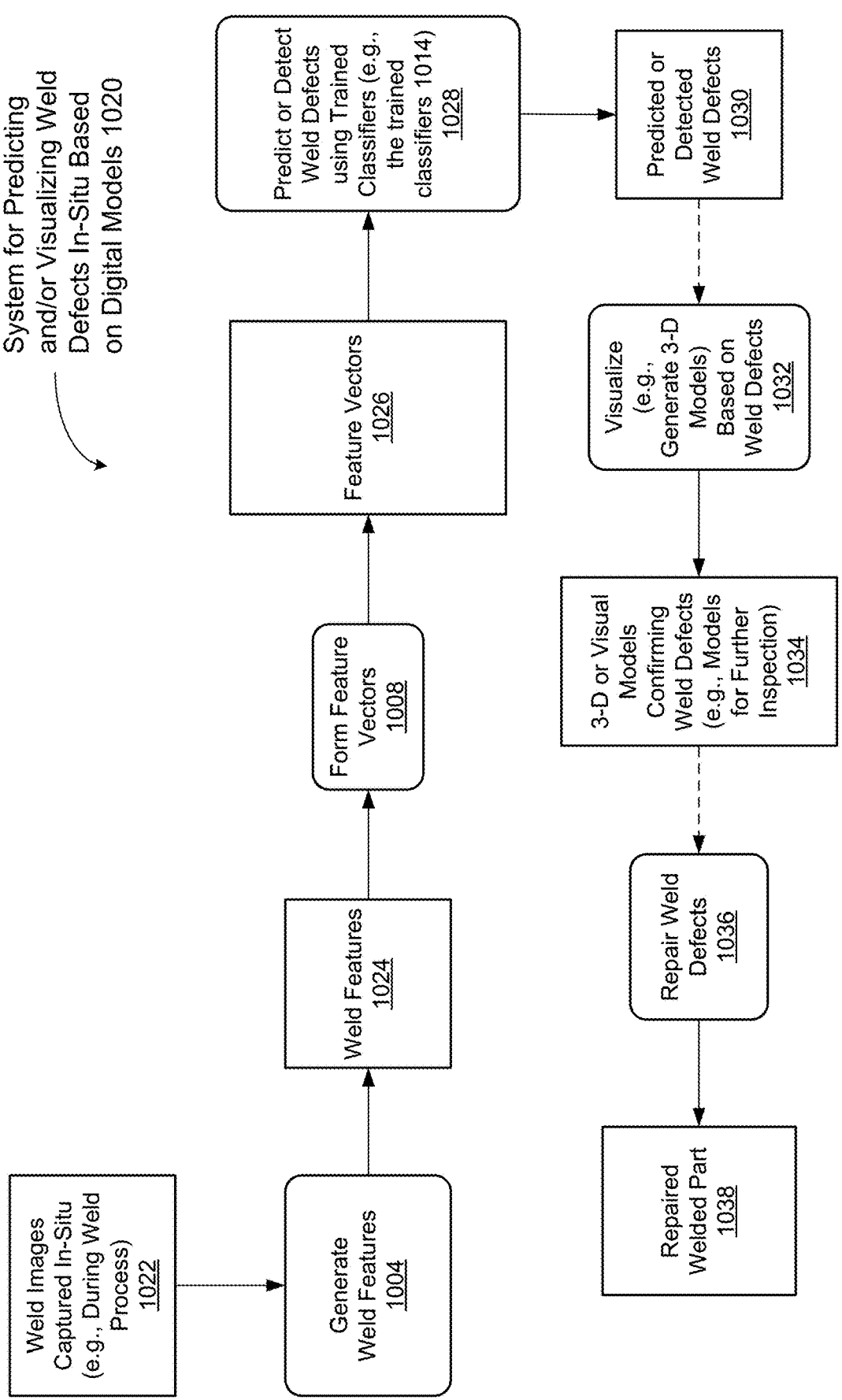
FIG. 10B is a block diagram illustrating a system that facilitates in-situ inspection of weld processes using trained regression models, according to some implementations.

FIG. 10B is a block diagram illustrating a system 1020 that facilitates in-situ inspection of weld processes using trained regression models (e.g., the regression models 1014 trained via the process described above in reference to FIG. 10A), according to some implementations.

In another aspect, a method is provided for detecting, identifying, and/or visualizing weld defects for in-progress welding process (sometimes called in-situ inspection of weld quality). The method is performed at a computer system 200 having one or more processors and memory storing one or more programs configured for execution by the one or more processors. The method includes receiving weld images 1022 from one or more cameras. The method also includes generating (1004) a plurality of weld features based on the weld images 1022 and/or weld parameters, as described above in reference to FIG. 10A. The method includes forming (1008) feature vectors 1026 v=[$v_1$, $v_2$, . . . , $v_n$] (e.g., as described above in reference to FIG. 10A) whose components include a plurality of features.

The method further includes predicting or detecting (1028) weld defects 1030 using the trained classifiers (e.g., the classifiers 1014), based on the feature vectors 1026.

In some implementations, the method also includes visualizing (e.g., generating 3-D models) (1032) based on the identified weld defects 1030. In some implementations, the generated 3-D or visual models 1034 confirm (or indicate) weld defects (e.g., models for further inspection).

In some implementations, the method facilitates (1036) a user (e.g., a human inspector or operator) to repair the identified and/or visualized weld defects, to obtain repaired welded part(s).

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for in-situ inspection of weld quality, the method comprising:
obtaining a plurality of sequenced images of an in-progress welding process, wherein the plurality of sequenced images captures temporal patterns related to characteristics of a weld pool for an entire weld event for the welding process forming an as-welded region;
generating a multi-dimensional data input based on the plurality of sequenced images and one or more weld process control parameters, wherein generating the multi-dimensional data input includes (i) detecting features and patterns from the plurality of sequenced images, (ii) assembling data across the entire weld event, (iii) assigning significance to the patterns, (iv) integrating the one or more weld process control parameters, and (v) extracting features of statistical significance, wherein the patterns include one or more of: a shape of a weld pool, a size of the weld pool, a contour of the weld pool, a depth of the weld pool, a thermal gradient of the weld pool, a change over time of the weld pool, and a uniformity of the weld pool, wherein assembling data across the entire weld event comprises applying temporal cross-correlations to align the plurality of sequenced images to geometry, and wherein generating the multi-dimensional data input comprises converting temporal image trends to stationary signals by taking a temporal derivative of the plurality of sequenced images;
generating defect probability and analytics information by applying one or more computer vision techniques on the multi-dimensional data input, wherein the analytics information includes predictive insights on quality features of the in-progress welding process, wherein the quality features include a type of weld defect and a location of the weld defect, wherein the one or more computer vision techniques includes applying a convolutional neural network with 3D convolutions on sequential, lagged batches of the plurality of sequenced images, wherein the 3D convolutions consider pixel position, intensity, and color/spectral band; and
generating a 3-D visualization of the as-welded region, based on the analytics information and the plurality of sequenced images, wherein the 3-D visualization displays the quality features for virtual inspection of the as-welded region.

2. The method of claim 1, wherein the one or more computer vision techniques includes one or more trained machine learning algorithms trained to identify anomalies or defects in an in-progress welding process based on image sequences.

3. The method of claim 2, wherein the one or more trained machine learning algorithms includes one or more trained unsupervised anomaly detection algorithms trained, on images of welds that passed a quality criterion, to identify defective welds based on image sequences.

4. The method of claim 3, wherein the one or more trained machine learning algorithms includes one or more trained supervised anomaly detection algorithms trained, on images of classified defective welds that failed a quality criterion, to identify defective welds based on image sequences.

5. The method of claim 2, wherein the one or more trained machine learning algorithms includes one or more trained supervised anomaly detection algorithms trained, on images of classified defective welds that failed a quality criterion, to identify defective welds based on image sequences.

6. The method of claim 2, wherein the multi-dimensional data input comprises a multi-dimensional array representing pixel intensity and color, and the one or more trained machine learning algorithms include a convolutional neural network (CNN) trained to identify boundaries of weld pool shape, speed, spatter, rate of change, and/or welding parameters, for determining weld qualities, defects, and/or one or more characterizations of the in-progress weld process, based on the multi-dimensional array.

7. The method of claim 6, wherein the convolutional neural network identifies boundaries of weld pool shape by identifying contours using thresholding or edge detection methods.

8. The method of claim 1, further comprising:
in accordance with a determination that the quality features of the in-progress welding process does not satisfy a predetermined quality criterion:
causing the in-progress welding process to cease; and
generating a warning of one or more events of the in-progress welding process based on the analytics information.

9. The method of claim 1, wherein weld process control parameters include one or more of:
shield gas flow rate, temperature, and pressure;
voltage, amperage, wire feed rate and optionally temperature;
part preheat/inter-pass temperature; and
part and weld torch relative velocity.

10. The method of claim 1, wherein the one or more computer vision techniques includes a temporal convolutional neural network that is trained with sliding window and gated activation functions to learn anomalies across time series data points.

11. The method of claim 1, wherein generating the 3-D visualization of the one or more as-welded regions comprises annotating the 3-D visualization with a quality assessment of a weld defect.

12. The method of claim 11, wherein the annotated quality assessment includes one or more of size of the weld defect, shape of the weld defect, extent of the weld defect, depth of the weld defect, and type of the weld defect.

13. The method of claim 1, wherein generating the 3-D visualization of the one or more as-welded regions comprises providing a visualization of normalized gradient of weights to indicate defect characteristics.

14. The method of claim 13, wherein the weights are indicated in time along the plurality of sequenced images, to locate the weld defect in time.

15. The method of claim 13, wherein the weights indicate part of an image that is different in terms of intensity, shape, or spectral hue.

16. The method of claim 1, wherein the one or more computer vision techniques includes one or more machine learning algorithms trained using laser profile progression by projecting laser light onto a post-weld surface to obtain a 3-D profile of the weld surface and voids to infer weld quality.

17. The method of claim 16, wherein the laser profile progression is performed at an angle to a welding plane.

18. The method of claim 16, wherein the laser profile progression is performed perpendicular to a welding plane.

19. The method of claim 1, wherein the virtual inspection of the as-welded region is used for determining weld quality of the as-welded region.

20. The method of claim 1, wherein the patterns further include one or more of: an intensity pattern within the weld pool, a spatter of the weld pool, and an alignment of the weld pool.

* * * * *